(12) United States Patent
Nakahara et al.

(10) Patent No.: US 10,041,805 B2
(45) Date of Patent: Aug. 7, 2018

(54) NAVIGATION SERVER AND PROGRAM

(71) Applicant: HONDA MOTOR CO., LTD., Tokyo (JP)

(72) Inventors: Daisuke Nakahara, Tokyo (JP); Shigeomi Kubota, Tokyo (JP); Kazuya Tamura, Tokyo (JP); Hiroshi Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/126,773

(22) PCT Filed: Mar. 4, 2015

(86) PCT No.: PCT/JP2015/056399
§ 371 (c)(1),
(2) Date: Sep. 16, 2016

(87) PCT Pub. No.: WO2015/141474
PCT Pub. Date: Sep. 24, 2015

(65) Prior Publication Data
US 2017/0122764 A1    May 4, 2017

(30) Foreign Application Priority Data
Mar. 20, 2014  (JP) .................................. 2014-059058

(51) Int. Cl.
G01C 21/34 (2006.01)
G01C 21/36 (2006.01)
(Continued)

(52) U.S. Cl.
CPC ...... *G01C 21/3611* (2013.01); *G01C 21/3614* (2013.01); *G08G 1/0969* (2013.01);
(Continued)

(58) Field of Classification Search
CPC ............ G01C 21/3611; G01C 21/3614; G08G 1/096816; G08G 1/096883; G08G 1/0969
(Continued)

(56) References Cited

U.S. PATENT DOCUMENTS

| 5,647,006 A * | 7/1997 | Martin ................ G10L 21/0208 379/392 |
| 2003/0120555 A1 | 6/2003 | Kitagawa |
| 2014/0141800 A1 * | 5/2014 | Eum ...................... H04W 4/043 455/456.1 |

FOREIGN PATENT DOCUMENTS

| JP | 2002-48586 | 2/2002 |
| JP | 2004-279299 | 10/2004 |

(Continued)

OTHER PUBLICATIONS

International Search Report, dated Jun. 2, 2015 (Jun. 2, 2015).

*Primary Examiner* — Muhammad Shafi
(74) *Attorney, Agent, or Firm* — Rankin, Hill & Clark LLP

(57) ABSTRACT

The same navigation information and facility information are directly distributed to both a vehicle-mounted navigation device and a portable terminal. A server is connected to the vehicle-mounted navigation device and portable terminal in a manner able to communicate, wherein on the basis of an information distribution request from the vehicle-mounted navigation device, facility information satisfying a predetermined standard is searched from a storage unit and distributed to the vehicle-mounted navigation device, it is determined whether or not the portable terminal is present within the vehicle on the basis of the current position information of the vehicle received from the vehicle-mounted navigation device and the current position information of the portable terminal received from the portable terminal, and when it has been determined that the portable (Continued)

terminal is present within the vehicle, the searched-for facility information satisfying the predetermined standard is directly distributed to the portable terminal as well.

5 Claims, 14 Drawing Sheets

(51) Int. Cl.
*G08G 1/0968* (2006.01)
*G08G 1/0969* (2006.01)
*G06Q 30/02* (2012.01)
*G06Q 50/12* (2012.01)

(52) U.S. Cl.
CPC . *G08G 1/096816* (2013.01); *G08G 1/096883* (2013.01); *G06Q 30/0239* (2013.01); *G06Q 50/12* (2013.01)

(58) Field of Classification Search
USPC .......................................................... 701/426
See application file for complete search history.

(56) References Cited

FOREIGN PATENT DOCUMENTS

| | | | |
|---|---|---|---|
| JP | 2005-151224 | | 6/2005 |
| JP | 2005151224 | * | 6/2005 |
| JP | 2009-190668 | | 8/2009 |
| JP | 2009-294860 | | 12/2009 |
| JP | 2010-015270 | | 1/2010 |
| JP | 2010-063019 | | 3/2010 |
| JP | 2010-147567 | | 7/2010 |
| JP | 2011-048582 | | 3/2011 |
| JP | 2013-050792 | | 3/2013 |
| KR | 2009-009411 | * | 1/2009 |

* cited by examiner

NAVIGATION SERVER AND PROGRAM

TECHNICAL FIELD

The present invention relates to a navigation server and a program for guiding (navigating) a user of a vehicle such as an automobile to a destination, and particularly, to a navigation server and a program for suggesting a stopover facility to a user and guiding the user to a facility selected by the user as a destination by a simple setting operation.

BACKGROUND ART

Conventionally, when a user travels to a destination by a vehicle such as an automobile, the user may need to stop over a facility for meals, a restroom, fueling, or the like in the middle of the travel. As a solving method thereof, a navigation system in which a vehicle-mounted navigation device mounted on a vehicle transmits a current vehicle position to a navigation server, and the navigation server retrieves facilities within a predetermined range of the current vehicle position and a future arrival location and suggests the searched facilities to the user has been proposed.

Moreover, a navigation system in which a portable terminal such as a cellular phone or a smartphone retrieves a coupon for a stopover facility, downloads electronic coupons and a route to the facility to the portable terminal, and transmits the route to the facility to a vehicle-mounted navigation device mounted on a vehicle is disclosed (for example, Patent Document 1).

Patent Document 1: Japanese Unexamined Patent Application, Publication No. 2004-279299

DISCLOSURE OF THE INVENTION

Problems to be Solved by the Invention

Among the conventional techniques, in a system in which a vehicle-mounted navigation device mounted on a vehicle transmits a current vehicle position to a navigation server and receives information on a facility from a navigation server that has retrieved a facility within a predetermined range of the current vehicle position and a future arrival location, the user has to input operations to press or touch buttons or a touch panel on the vehicle-mounted navigation device and view the screen. Thus, it is basically restricted to receive operations when the vehicle is in a stopped state only due to safety reasons.

However, a driver during traveling may rarely bother to stop the vehicle in order to obtain information on a facility, and such a navigation server system has not been used widely.

Moreover, in the system disclosed in Patent Document 1, a mechanism for establishing communication connection between proximity devices for connecting a portable terminal to a vehicle-mounted navigation device is required.

A number of standards for establishing communication connection between proximity devices have been developed. Examples of currently typical standards include cable communication connection standards such as USB (Universal Serial Bus (registration mark)), IEEE 1394, and HDMI (High-Definition Multimedia Interface (registration mark)) and wireless communication connection standards such as Wi-Fi (Wireless Fidelity (registration mark) and Bluetooth (registration mark).

However, mounting these standards on both a portable terminal and a vehicle-mounted navigation device may increase the cost and was practically difficult.

Moreover, even if the same standard is employed in both the portable terminal and the vehicle-mounted navigation device, since the replacement cycles of the portable terminal and the vehicle are different greatly, the following risks may occur.

For example, the version of the standard for communication connection between proximity devices mounted on a portable terminal which may be replaced every year or every two years may be updated drastically or replaced at a cycle of one to two years. Therefore, when a user has replaced a portable terminal, the standard for communication connection between proximity devices mounted on the replaced portable terminal may be different from the standard for communication connection between proximity devices mounted on a vehicle which may often be used 10 years or more. As a result, a risk that the system disclosed in Patent Document 1 cannot be used as well as a risk that a connection cannot be established between the replaced portable terminal of the user and the vehicle-mounted navigation device mounted on the vehicle may happen.

The present invention has been made in view of such a problem. An object of the present invention is to provide a navigation server and a program capable of allowing a navigation server to directly distribute the same navigation information, the same facility information, and the like to a portable terminal checked by an occupant riding on a vehicle and a vehicle-mounted navigation device mounted on the vehicle.

Means for Solving the Problems (1) A server (for example, a navigation server 3 to be described later) which is communicably connected to a portable terminal (for example, a portable terminal 2 to be described later) and a vehicle-mounted navigation device (for example, a vehicle-mounted navigation device 1 to be described later) mounted on a vehicle, the server including: a wireless unit (for example, a communication unit 12 to be described later); a storage unit (for example, a storage unit 31 to be described later) that stores facility information; a facility retrieval unit (for example, a facility retrieval unit 304 to be described later) that retrieves facility information that satisfies predetermined conditions from the storage unit; a first determination unit (for example, a first determination unit 303 to be described later) that determines whether the portable terminal is present inside the vehicle based on current vehicle position information received from the vehicle-mounted navigation device via the wireless unit and current position information of the portable terminal, received from the portable terminal via the wireless unit; and a facility information providing unit (for example, a facility information providing unit 305 to be described later) that transmits the facility information retrieved by the facility retrieval unit to the vehicle-mounted navigation device via the wireless unit, wherein the facility information providing unit further transmits the facility information retrieved by the facility retrieval unit to the portable terminal via the wireless unit when the first determination unit determines that the portable terminal is present inside the vehicle.

The facility information providing unit of the server of (1) transmits the facility information retrieved by the facility retrieval unit to the vehicle-mounted navigation device and the portable terminal via the wireless unit.

Due to this, even when a driver wants to check information on a stopover facility during operation of the vehicle, an occupant of the vehicle can check and select the facility information without the driver stopping the vehicle.

Particularly, since the server determines whether the facility information is to be transmitted to the portable terminal based on the current vehicle position information and the current position information of the portable terminal, the user can easily receive the necessary facility information from the server without inputting complex setting.

(2) The server of (1) further including: upon receiving at least one item of facility information selected from items of facility information transmitted by the facility information providing unit (for example, a facility information providing unit 305 to be described later) from the portable terminal (for example, a portable terminal 2 to be described later) via the wireless unit (for example, a communication unit 32 to be described later), a route setting unit (for example, a route setting unit 306 to be described later) sets a facility corresponding to the facility information as a destination based on the selected at least one item of facility information; and a route notification unit (for example, a route notification unit 307 to be described later) that transmits facility information of the facility set as the destination to the vehicle-mounted navigation device (for example, a vehicle-mounted navigation device 1 to be described later) via the wireless unit.

When a facility is selected by the portable terminal of an occupant of the vehicle, the route setting unit of the server of (2) transmits the selected facility to the vehicle-mounted navigation device as a destination.

Due to this, the destination is automatically set without requiring any special operation of the driver of the vehicle.

(3) The server of (2) in which the route setting unit (for example, a route setting unit 306 to be described later) further creates route information from the current vehicle position to the facility set as the destination, and the route notification unit (for example, a route notification unit 307 to be described later) further transmits the route information to at least the vehicle-mounted navigation device (for example, a vehicle-mounted navigation device 1 to be described later) via the wireless unit (for example, a communication unit 32 to be described later).

When a stopover facility is selected by the portable terminal of an occupant of the vehicle, the route notification unit of the server of (3) transmits the route information in which the selected facility is set as a destination to the vehicle-mounted navigation device mounted on the vehicle.

Due to this, the destination is automatically set without requiring any special operation of the driver of the vehicle.

(4) The server (for example navigation server 3 described later) of (2) or (3) further including: a second determination unit (for example, a second determination unit 308 to be described later) that determines whether the vehicle has stayed in the facility set as the destination based on ignition ON information of the vehicle received via the wireless unit (for example, a communication unit 32 to be described later), the position information of the vehicle at the ignition ON time, and position information of the facility set as the destination when the vehicle travels near the facility.

The second determination unit of the server of (4) automatically determines whether the user has stayed in the facility.

Due to this, since the server automatically determines whether the vehicle has stayed in the facility without requiring any special operation of the user after the vehicle arrives at the destination facility, a success reward (charge) process on the facility, for example, for guiding the user to the facility can be performed easily and fairly.

(5) A program for causing a control unit of a server (for example, a navigation server 3 to be described later) which includes a wireless unit (for example, a communication unit 32 to be described later), a storage unit (for example, a storage unit 31 to be described later) that stores facility information, and the control unit (for example, a control unit 30 to be described later) to function as: a facility retrieval unit (for example, a facility retrieval unit 304 to be described later) that retrieves facility information that satisfies predetermined conditions from the storage unit; a first determination unit (for example, a first determination unit 303 to be described later) that determines whether a portable terminal communicably connected to the server via the wireless unit is present inside the vehicle based on current vehicle position information received from a vehicle-mounted navigation device (for example, a vehicle-mounted navigation device 1 to be described later) mounted on a vehicle, communicably connected to the server via the wireless unit and current position information of the portable terminal, received from the portable terminal via the wireless unit; and a facility information providing unit (for example, a facility information providing unit 305 to be described later) that transmits the facility information retrieved by the facility retrieval unit to the vehicle-mounted navigation device via the wireless unit, wherein the facility information providing unit further transmits the facility information retrieved by the facility retrieval unit to the portable terminal via the wireless unit when the first determination unit determines that the portable terminal is present inside the vehicle.

(6) The program of (5) further causing the control unit (for example, a control unit 30 to be described later) to function as: upon receiving at least one item of facility information selected from items of facility information transmitted by the facility information providing unit (for example, a facility information providing unit 305 to be described later) from the portable terminal (for example, a portable terminal 2 to be described later) via the wireless unit (for example, a communication unit 32 to be described later), a route setting unit (for example, a route setting unit 306 to be described later) sets a facility corresponding to the facility information as a destination based on the selected at least one item of facility information; and a route notification unit (for example, a route notification unit 307 to be described later) that transmits facility information of the facility set as the destination to the vehicle-mounted navigation device via the wireless unit.

(7) The program of (6) in which the control unit causes the route setting unit (for example, a route setting unit 306 to be described later) to further create route information from the current vehicle position to the facility set as the destination, and the control unit causes the route notification unit (for example, a route notification unit 307 to be described later) to further transmit the route information to at least the vehicle-mounted navigation device via the wireless unit (for example, a communication unit 32 to be described later).

(8) The program of (6) or (7), further causing the control unit (for example, a control unit 30 to be described later) to function as: a second determination unit (for example, a second determination unit 308 to be described later) that determines whether the vehicle has stayed in the facility set as the destination based on ignition ON information of the vehicle received via the wireless unit (for example, a communication unit 32 to be described later), the position information of the vehicle at the ignition ON time, and position information of the facility set as the destination when the vehicle travels near the facility.

According to the programs of (5) to (8), the same advantages as those of the servers of (1) to (4) can be obtained.

Effects of the Invention

According to the present invention, even when a driver wants to check information on a stopover facility during operation of the vehicle, an occupant of the vehicle, for example, can check and select the facility information without the driver stopping the vehicle.

Particularly, since the server determines whether the facility information is to be transmitted to the portable terminal based on the current vehicle position information and the current position information of the portable terminal, the user can easily receive the necessary facility information from the server without inputting complex settings.

The destination is automatically set without requiring any special operation of the driver of the vehicle.

Since the server automatically determines whether the vehicle has stayed in the facility without requiring any special operation of the user after the vehicle arrives at the destination facility, a success reward (charge) process on the facility, for example, for guiding the user to the facility can be performed easily and fairly.

PREFERRED MODE FOR CARRYING OUT THE INVENTION

First Embodiment

Hereinafter, a preferred embodiment of a navigation system according to the present invention will be described with reference to FIGS. 1 to 5G.

[Functional Configuration of Navigation System 100]

A functional configuration of the navigation system 100 according to a preferred embodiment of the present invention will be described.

Figure 1:
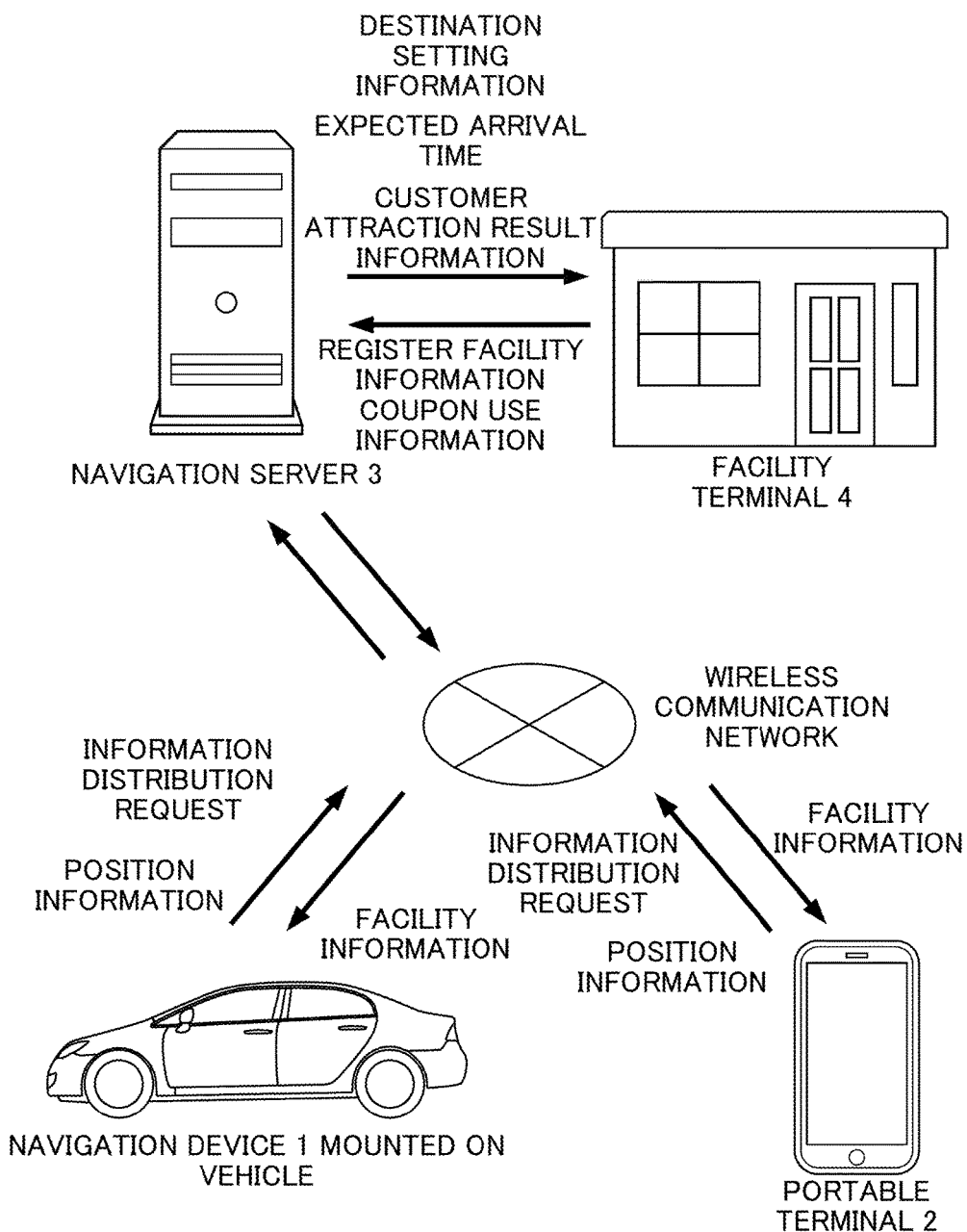
FIG. 1 is a diagram illustrating a system configuration of a navigation system 100.

As illustrated in FIG. 1, the navigation system 100 is configured to include a vehicle-mounted navigation device 1 mounted on a vehicle, a portable terminal 2, a navigation server 3, and a facility terminal 4.

The vehicle-mounted navigation device 1 mounted on a vehicle includes a PND and the like. Software such as a navigation (route guidance) is installed in the vehicle-mounted navigation device 1, and a route from a current position to a destination can be guided based on a user's request.

The software such as a navigation (route guidance) may be installed in advance. Moreover, the software may be appropriately downloaded as necessary when transmitting and receiving data to and from the navigation server 3.

The portable terminal 2 is a cellular phone, a smartphone, a tablet terminal, a PDA, a note PC, and other portable electronic devices, and includes an electronic device having a wireless communication function. Navigation software is installed in the portable terminal 2 and can guide a route from a current position to a destination based on a user's request.

The navigation software may be installed in advance. Moreover, the navigation software may be appropriately downloaded as necessary when transmitting and receiving data to and from the navigation server 3.

The navigation server 3 transmits and receives information to and from the vehicle-mounted navigation device 1, the portable terminal 2, and the facility terminal 4 via a communication unit 32. The navigation server 3 extracts a plurality of facilities located near a current position in a traveling direction from a current vehicle position and a plurality of facilities located near a route extending from a current vehicle position to a target position based on current vehicle position information and distributes the plurality of facilities to the vehicle-mounted navigation device 1 and the portable terminal 2. The navigation server 3 distributes route information in which the facility is set as a destination to the vehicle-mounted navigation device 1 based on the facility set by the portable terminal 2.

In the embodiment of the present invention, although the navigation server 3 is illustrated as one server, the navigation server 3 may be a distributed processing system in which the functions of the navigation server 3 are appropriately distributed to a plurality of servers. Moreover, the functions of the navigation server 3 may be realized on a cloud using a virtual server function or the like.

The facility terminal 4 transmits and receives information to and from the navigation server 3 via the communication unit 42. The facility information (for example, a valid period for facility information, a distribution time period, distribution image information, goods and services information, coupon information, vacancy information, and the like) distributed by the navigation server 3 can be input from the facility terminal 4 to the navigation server 3 on a realtime basis.

The facility information is generally referred to as POI (Point Of Interest).

Moreover, the facility terminal 4 can receive customer information (for example, information on a vehicle or a user that has set the facility as a destination, the number of visiting persons, an expected arrival time, information on whether another facility is set as a destination, and the like) from the navigation server 3 on a realtime basis (for example, the customer information can be checked or notified by an email, or the like). Furthermore, the facility terminal 4 can check customer attraction result information (for example, customer attraction information on customers guided to the facility by the navigation system, coupon use information, and the like) from the navigation server 3.

In the embodiment of the present invention, although the facility terminal 4 is illustrated as one system, the facility terminal 4 may be a distributed processing system in which the functions of the facility terminal 4 are appropriately distributed to a plurality of computers. Moreover, the functions of the facility terminal 4 may be realized on a cloud using a virtual terminal function, a virtual server function, or the like.

In the embodiment of the present invention, the vehicle-mounted navigation device 1 and the portable terminal 2 are preferably synchronized, for example, by an NTP server or the like so that the time of the vehicle-mounted navigation device 1 is identical to the time of the portable terminal 2.

By doing so, connection history records or the like in which the time information of the vehicle-mounted navigation device 1 and the portable terminal 2 is recorded can be compared.

Next, the respective configurations will be described.
<Vehicle-Mounted Navigation Device 1>

Figure 2:
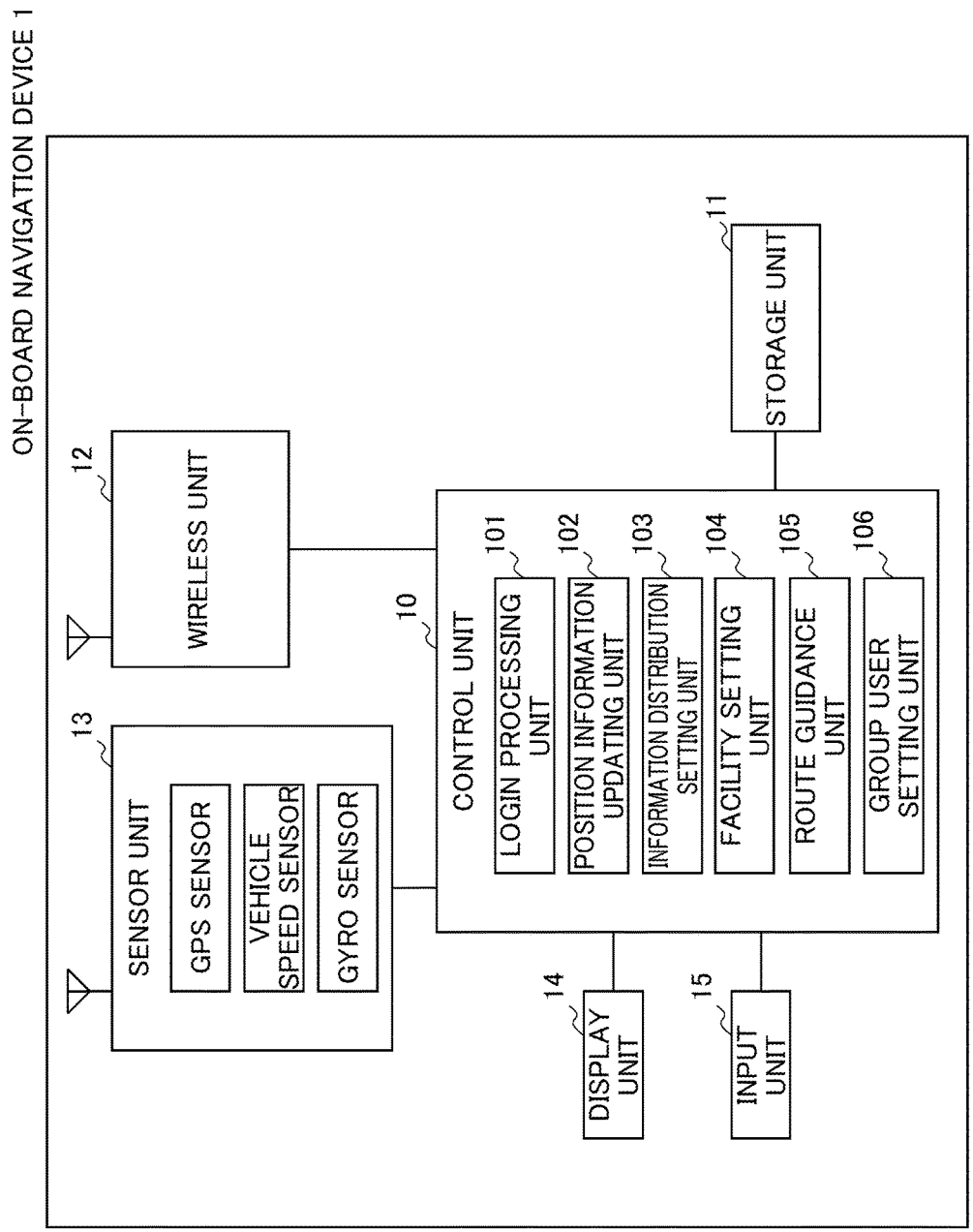
FIG. 2 is a diagram illustrating a configuration of a vehicle-mounted navigation device 1 mounted on a vehicle.

As illustrated in FIG. 2, the vehicle-mounted navigation device 1 mounted on a vehicle at least includes a control unit 10, a storage unit 11, a wireless unit 12, a sensor unit 13, a display unit 14, and an input unit 15.

The control unit 10 is configured as a microprocessor or the like and controls respective constituent units. The details thereof will be described later.

The storage unit 11 is configured as a semiconductor memory or the like and stores an operating system (OS), programs for guiding routes, and various items of information such as map information and position information. The map information may be stored in advance in the storage unit 11 or may be acquired from the navigation server 1.

The wireless unit 12 includes a DSP (Digital Signal Processor) or the like and is configured to perform wireless communication via a wireless communication network represented by a cellular phone network such as 3G or LTE and perform wireless communication with the navigation server 3.

The wireless unit 12 can transmit an identification number (hereinafter also referred to as a "vehicle ID") for identifying a vehicle, a password, current vehicle position information, a facility information distribution request, and the like to the navigation server 3 and can receive route information and the like from the navigation server 3.

The sensor unit 13 includes a GPS sensor, a vehicle speed sensor, a gyro sensor, and the like provided in a vehicle. The sensor unit 13 has the function of position detection means for detecting a current position and receives a GPS satellite signal using a GPS sensor to measure a current vehicle position (latitude and longitude). Moreover, since a vehicle speed sensor, a gyro sensor, a geomagnetic sensor, and the like are provided, it is possible to measure the current vehicle position by autonomous navigation. When the GPS sensor cannot measure the current position from a GPS satellite signal, it is possible to measure the current position instead of the GPS sensor.

In addition, when GPS communication is not possible, it is possible to calculate the current vehicle position based on base station information acquired from the wireless unit 12 using AGPS (Assisted Global Positioning System) communication.

The display unit 14 is configured as a display device such as a liquid crystal display or an organic EL panel or the like, and displays an image according to an instruction received from the control unit 10. The display unit 15 can display various items of information such as the current vehicle position, map information near the current vehicle position read from the storage unit 11, the facility information acquired from the navigation server 3 via the wireless unit 12, the destination set by the user, and route information.

The input unit 15 includes an input device (not illustrated) or the like such as physical switches called numeric keys and a touch panel provided to be superimposed on a display surface of the display unit 14. A signal based on an operation (for example, pressing of numeric keys or touching of a touch panel) input from the input unit 15 is output to the control unit 10 whereby an operation of determining a stopover facility, zooming in and out of a map can be performed.

Besides this, although not illustrated in the drawings, a speaker 16 and a microphone 17 may be provided. The speaker 16 outputs a sound to a driver and the microphone 17 collects a voice uttered by the driver.

By doing so, it is possible to output information from the speaker 16 as a sound and to input various selections and instructions from the driver (or the user) input as a voice via the microphone 17 to the control unit 10 with the aid of a voice recognition technique.

The control unit 10 is configured as a microprocessor including a CPU, a RAM, a ROM, an I/O, and the like. The CPU executes programs read from the ROM or the storage unit 11, and during execution of the programs, reads information from the RAM, the ROM, and the storage unit 11, writes information to the RAM and the storage unit 11, and exchanges signals with the wireless unit 12, the sensor unit 13, the display unit 14, and the input unit 15.

The control unit 10 executes the respective programs (hereinafter also referred to collectively as a "route setting and guidance application") to allow the vehicle-mounted navigation device 1 to function as predetermined means (hereinafter referred to collectively as a "route setting and guidance unit"). For example, when a program for route guidance is activated, route guidance that instructs left and right turns while displaying the current position using the position information from the sensor unit 12 can be realized.

Moreover, the control unit 10 executes the respective programs to allow the vehicle-mounted navigation device 1 to execute predetermined procedures (hereinafter collectively referred to as a "route setting and guidance procedure").

Hereinafter, the functions of the control unit 10 will be described from the viewpoint of a route setting and guidance unit. The description based on the viewpoint of the route setting and guidance procedure (method) will not be provided since the same description is applied to the route setting and guidance procedure by replacing "unit" with "procedure".

As illustrated in FIG. 2, the control unit 10 includes a connection processing unit 101, a position information updating unit 102, an information distribution setting unit 103, a facility setting unit 104, a route guidance unit 105, and a group user setting unit 106.

<Automated Activation>

The vehicle-mounted navigation device 1 is automatically activated when a driver turns on an ignition switch of a vehicle (that is, the driver starts up the engine). The vehicle-mounted navigation device 1 operates until the driver turns off the ignition switch of the vehicle (that is, the driver stops the engine).

<Connection Processing Unit 101>

When the vehicle-mounted navigation device 1 is automatically activated, the connection processing unit 101 executes a login process to the navigation server 3, for example, using an identification number (a vehicle ID) for identifying a vehicle and a password and transmits current vehicle position information calculated by the sensor unit 13, and current time information or the like acquired from a clock unit (not illustrated) to the navigation server 3.

The vehicle-mounted navigation device 1 and the portable terminal 2 are preferably synchronized, for example, by an NTP server or the like so that the time of the vehicle-mounted navigation device 1 is identical to the time of the portable terminal 2 as described later.

<Position Information Updating Unit 102>

The position information updating unit 102 periodically transmits the vehicle ID, the current vehicle position information calculated by the sensor unit 13, and the current time information or the like acquired from the clock unit (not illustrated) to the navigation server 3. The transmitted information may include a vehicle traveling direction calculated by the sensor unit 13.

The position information updating unit 102 can transmit (in a so-called burst transmission mode) a plurality of items of information (for example, the current vehicle position information, and the current time information or the like for five minutes) at a time rather than transmitting the current vehicle position information, and the current time information or the like acquired at a predetermined time interval (for example, every three seconds) to the navigation server 3 on a realtime basis.

The acquisition time interval (for example, every three seconds) of the current vehicle position information and the like, the number of items of information transmitted at a time when a plurality of items of information are transmitted in a burst mode, and the like can be set in advance.

Moreover, when a vehicle traveling direction is included, the navigation server 3 to be described later can suggest facilities located within a predetermined distance in the traveling direction from a current vehicle position as candidates. By doing so, it is possible to prevent a facility which the vehicle needs to turn back to reach from being suggested as a candidate.

In a period before an ignition switch is turned off (the engine is stopped) after the route guidance unit 105 determines that the vehicle has arrived at a destination, the position information updating unit 102 can transmit the vehicle ID, the current vehicle position information calculated by the sensor unit 13, and the current time information or the like acquired from the clock unit (not illustrated) to the navigation server 3.

<Information Distribution Setting Unit 103>

Figure 7A:
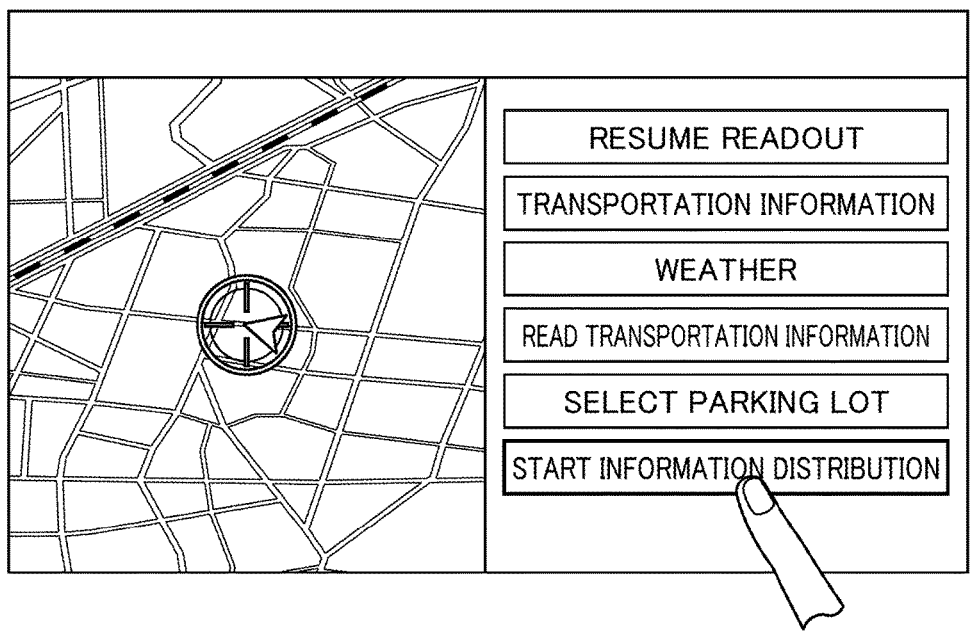
FIG. 7A is a diagram illustrating an example of a screen for starting distribution of information, displayed on the vehicle-mounted navigation device 1.

As illustrated in FIG. 7A, the information distribution setting unit 103 displays a "information distribution start ON" button, for example, on the display unit 14 and transmits an information distribution start request via the wireless unit 12 to the navigation server 3 when an information distribution start signal is turned on by the user touching on the button. Here, the information distribution start request at least includes the vehicle ID, the current vehicle position information calculated by the sensor unit 13, and the current time information or the like acquired from the clock unit (not illustrated). The information distribution may be turned on by the input unit 15.

For example, a list of facility categories may be displayed on the display unit 14 and a category of facilities may be selected by the user whereby an information distribution start request for facilities belonging to the selected category may be transmitted.

By transmitting the information distribution start request, the information distribution setting unit 103 receives facility information on recommended facilities located near the current vehicle position and a traveling route, for example, from the navigation server 3 at a predetermined time interval (for example, every five minutes) for a predetermined period (for example, 30 minutes).

<Facility Setting Unit 104>

The facility setting unit 104 receives the facility information on recommended facilities located near the current vehicle position and the traveling route, for example, distributed from the navigation server 3 via the wireless unit 12. The facility information is distributed at a predetermined time interval (for example, every five minutes) for a predetermined period (for example 30 minutes) as described above.

Here, as will be described later, the facility information may include, for example, facility identification information, a facility name, a facility category, a facility telephone number, a facility address (for example, position information specified by latitude, longitude, and the like), information on goods and services or the like provided by the facility, vacancy information, coupon issuance information, and the like.

Figure 7B:
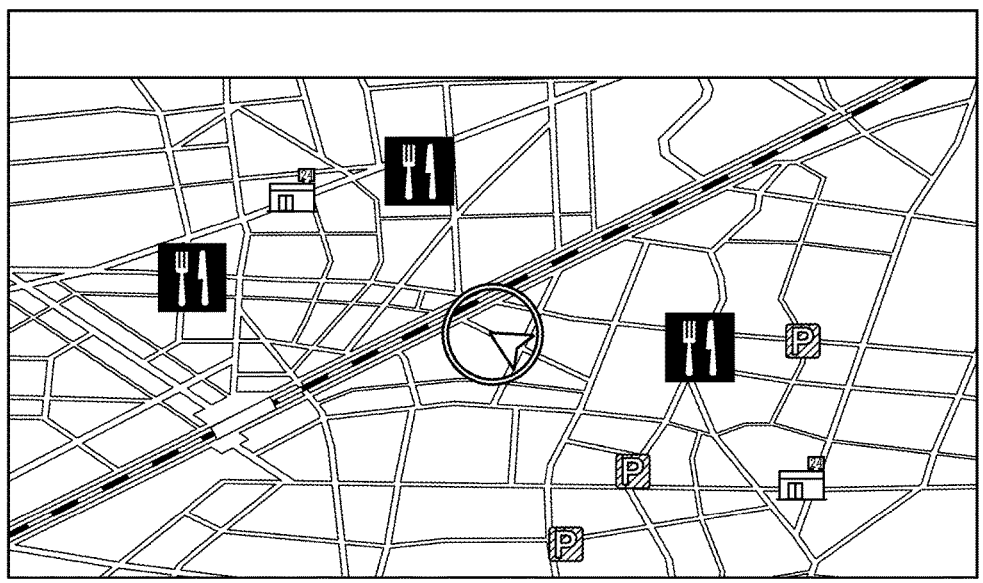
FIG. 7B is a diagram illustrating an example of a screen for displaying the distributed facility location, displayed on the vehicle-mounted navigation device 1.

For example, as illustrated in FIG. 7B, the facility setting unit 104 displays the position of a facility on a map around the current vehicle position on the display unit 14 based on the distributed facility information.

The vehicle-mounted navigation device 1 mounted to a vehicle has a mechanism (so-called a driver distraction prevention mechanism) for inhibiting complex operations to secure safety during traveling.

Due to this, during stopping of a vehicle, the facility setting unit 104 can display the facility information (for example, information on goods and services or the like provided by a facility, vacancy information, coupon issuance information, and the like) distributed from the navigation server 3 on the display unit 14 in a scrollable manner in response to an instruction such as a user operation on a touch panel or an operation on the input unit 15.

By doing so, during stopping of a vehicle, the facility setting unit 104 can allow the user to select a stopover facility. The facility setting unit 104 can transmit the facility selected by the user to the navigation server 3 via the wireless unit 12.

On the other hand, during operation of a vehicle, by the driver distraction prevention mechanism, the facility setting unit 104 is restricted to perform an operation of displaying the distributed facility information (for example, information on goods and services or the like provided by the facility, vacancy information, coupon issuance information, and the like) on the display unit 14 based on a touch operation on the touch panel or an operation on the input unit 15 in a scrollable manner to allow the user to select a stopover facility, and transmitting the selected facility to the navigation server 3.

Information may be input to the control unit 10 using a voice recognition technique such that the facility information distributed from the navigation server 3 is output from the speaker 16 as an audio and the facility is selected by inputting a voice via the microphone 17.

<Route Guidance Unit 105>

The route guidance unit 105 receives route information in which the facility selected by the facility setting unit 104 (in a stopped state of a vehicle only) or the portable terminal 2 to be described later is set as a destination from the navigation server 3 via the wireless unit 12. The route guidance unit 105 executes route guidance based on the received route information.

As another embodiment, the route information may be calculated by the vehicle-mounted navigation device 1 (for example, the route guidance unit 105) instead of receiving the same from the navigation server 3.

As described above, in a period before the ignition switch is turned off (the engine is stopped) after the route guidance unit 105 determines that the vehicle has arrived at a destination, the position information updating unit 102 can transmit the vehicle ID, the current vehicle position information calculated by the sensor unit 13, and the current time information or the like acquired from the clock unit (not illustrated) to the navigation server 3.

<Group User Setting Unit 106>

The group user setting unit 106 sets user IDs belonging to the same user group as the vehicle ID to the navigation server 2 in advance. A plurality of user IDs can be set so as to belong to the same user group as the vehicle ID.

By doing so, when the vehicle-mounted navigation device 1 (the information distribution setting unit 103) transmits the information distribution start request to the navigation server 3, the navigation server 3 can distribute the facility information on the recommended facility located near the current vehicle position and the traveling route to the portable terminals 2 corresponding to the user IDs belonging to the same user group.

As will be described later, the user IDs belonging to the same user group as the vehicle ID may be set by a portable terminal group user setting unit 203 of the portable terminal 2.

Next, the portable terminal 2 will be described.

<Portable Terminal 2>

Figure 3:
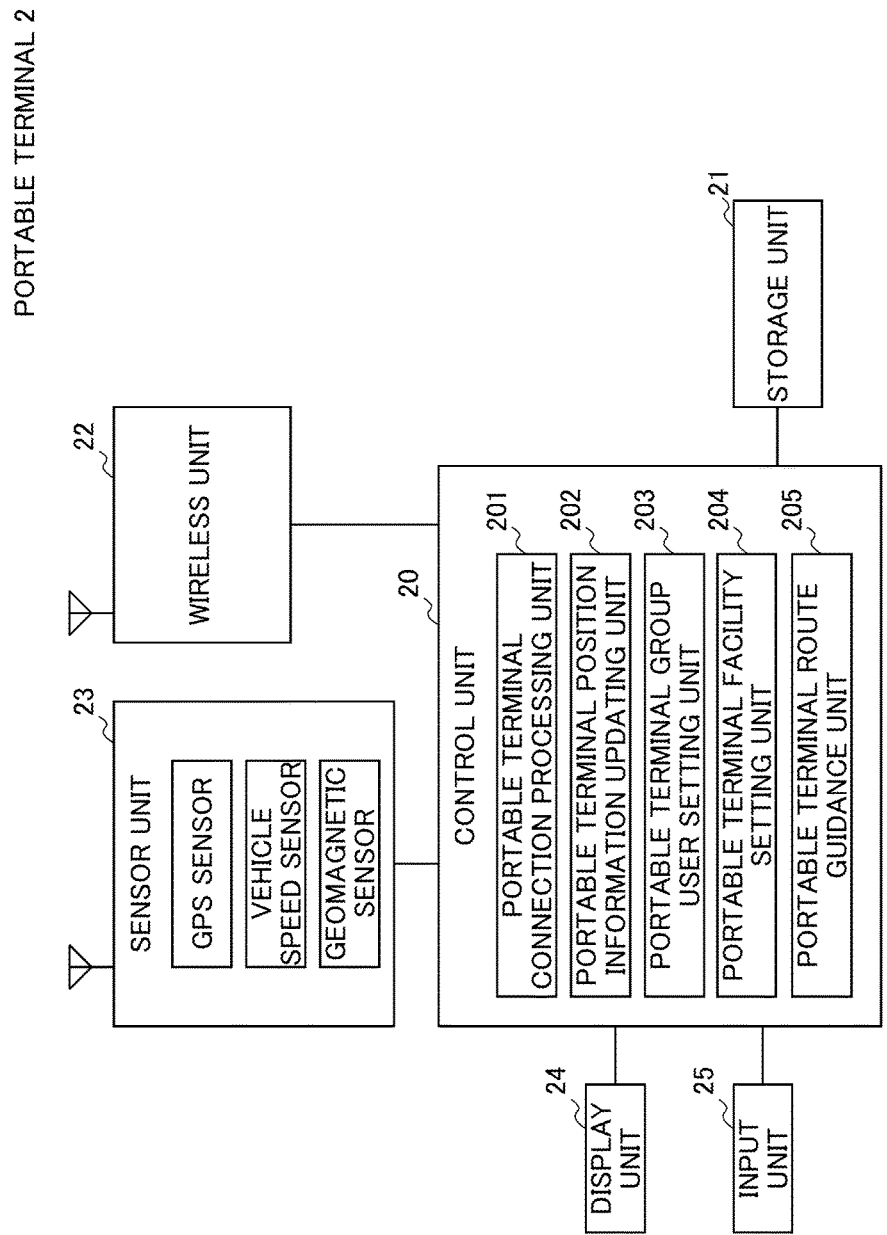
FIG. 3 is a diagram illustrating a configuration of a portable terminal 2.

As illustrated in FIG. 3, the portable terminal 2 at least includes a control unit 20, a storage unit 21, a wireless unit 22, a sensor unit 23, a display unit 24, and an input unit 25.

The control unit 20 is configured as a microprocessor or the like and controls the respective constituent units. The details thereof will be described later.

The storage unit 21 is configured as a semiconductor memory or the like and stores an operating system (OS), various programs for route guidance, and various items of information such as map information, road link information, and position information. The map information, the road link information, and the like may be stored in advance in the storage unit 21. Moreover, the map information, the road link information, and the like may be acquired appropriately from the navigation server 3.

The wireless unit 22 includes a DSP (Digital Signal Processor) or the like and is configured to perform wireless communication via a wireless communication network represented by a cellular phone network such as 3G or LTE and perform wireless communication with the navigation server 3.

The wireless unit 22 can transmit current position information of the portable terminal 2, an ID (hereinafter referred to as a "user ID") for identifying a service subscription state, a password, facility information set as a destination, and the like to the navigation server 3 and receive facility information, electronic coupon information of facilities, route information, and the like from the navigation server 3.

The sensor unit 23 includes a GPS sensor, a gyro sensor, a geomagnetic sensor, and the like. The sensor unit 23 has the function of position detection means for detecting the current position and receives a GPS satellite signal using a GPS sensor to measure the current position (latitude and longitude) of the portable terminal 2.

Moreover, when GPS communication is not possible, it is possible to calculate the current vehicle position based on base station information acquired from the wireless unit 22 using AGPS (Assisted Global Positioning System) communication.

The display unit 24 is configured as a display device such as a liquid crystal display or an organic EL panel and displays an image according to an instruction received from the control unit 20. The display unit 24 displays various items of information such as the current position of the portable terminal 2, map information near the current portable terminal position read from the storage unit 21, the facility information acquired from the navigation server 3 via the wireless unit 22, the destination set by the user, and route information.

The input unit 25 includes an input device (not illustrated) such as physical switches called numeric keys and a touch panel provided to be superimposed on a display surface of the display unit 24. A signal based on an operation (for example, pressing of numeric keys or touching of a touch panel) input from the input unit 25 is output to the control unit 20 whereby an operation of determining a stopover facility, zooming in and out of a map can be performed.

The control unit 20 is configured as a microprocessor including a CPU, a RAM, a ROM, an I/O, and the like. The CPU executes programs read from the ROM or the storage unit 21, and during execution of the programs, reads information from the RAM, the ROM, and the storage unit 21, writes information to the RAM and the storage unit 21, and exchanges signals with the wireless unit 22, the sensor unit 23, the display unit 24, and the input unit 25.

The control unit 20 executes the respective programs (hereinafter also referred to collective as a "portable terminal route setting and guidance application") to allow the portable terminal 2 to function as predetermined means (hereinafter referred to collectively as a "portable terminal route setting and guidance unit"). For example, when programs for route guidance are activated, route guidance that instructs left and right turns while displaying the current position using the position information from the sensor unit 23 can be realized.

Moreover, the control unit 20 executes the respective programs for route guidance to allow the portable terminal 2 to execute predetermined procedures (hereinafter also referred to collectively as a "portable terminal route setting and guidance procedure").

Hereinafter, the functions of the control unit 20 will be described from the viewpoint of a portable terminal route setting and guidance unit. The description based on the viewpoint of the portable terminal route setting and guidance procedure (method) will not be provided since the same description is applied to the portable terminal route setting and guidance procedure by replacing "unit" with "procedure".

As illustrated in FIG. 3, the control unit 20 includes a portable terminal connection processing unit 201, a portable terminal position information updating unit 202, a portable terminal group user setting unit 203, a portable terminal facility setting unit 204, and a portable terminal route guidance unit 205.

<Portable Terminal Connection Processing Unit 201>

When a portable terminal route setting and guidance application is activated by a user, the portable terminal connection processing unit 201 turns on a GPS sensor and the like, executes a login process to the navigation server 3, for example, using an ID (hereinafter also referred to as a "user ID") for identifying a service subscription state of the user and a password, and transmits the current position information of the portable terminal 2 calculated by the sensor unit 23 and the current time information or the like acquired from a clock unit (not illustrated) to the navigation server 3.

When the user ends the activation of the portable terminal route setting and guidance application of the portable terminal 2, the portable terminal route setting and guidance application stops its function.

<Portable Terminal Position Information Updating Unit 202>

The portable terminal position information updating unit 202 periodically transmits the user ID, the current position information of the portable terminal 2 calculated by the sensor unit 23, and the current time information or the like acquired from the clock unit (not illustrated) to the navigation server 3. The transmitted information may include a traveling direction of the portable terminal 2 calculated by the sensor unit 23.

As described above, the portable terminal 2 and the vehicle-mounted navigation device 1 are preferably synchronized, for example, by an NTP server or the like so that the time of the portable terminal 2 is identical to the time of the vehicle-mounted navigation device 1.

Moreover, the timings at which the current position information and the like of the portable terminal 2 are acquired may be synchronized with the timing at which the current position information or the like of the vehicle-mounted navigation device 1 are acquired.

Moreover, the time interval at which the current position information and the like of the portable terminal 2 are acquired may be, for example, an integer multiple of the time interval at which the current position information and the like of the vehicle-mounted navigation device 1 are acquired. By doing so, the current position of the portable terminal 2 and the current vehicle position can be compared at the same time.

The portable terminal position information updating unit 202 periodically transmits the user ID, the current position information of the portable terminal 2 calculated by the sensor unit 13, and the current time information or the like acquired from the clock unit (not illustrated) to the navigation server 3 until the portable terminal route setting and guidance application of the portable terminal 2 ends.

The portable terminal position information updating unit 202 can transmit (in a so-called burst transmission mode) a plurality of items of information (for example, the current position information of the portable terminal 2 and the current time information or the like for five minutes) at a time rather than transmitting the current position information of the portable terminal 2 and the current time information or the like acquired at a predetermined time interval (for example, every three seconds) to the navigation server 3 on a realtime basis.

The acquisition time interval of the current position information and the like of the portable terminal 2 and the number of items of information transmitted at a time when a plurality of items of information are transmitted in a burst mode, and the like can be set in advance.

<Portable Terminal Group User Setting Unit 203>

The portable terminal group user setting unit 203 can designate vehicle IDs belonging to the same user group as the user ID of the portable terminal 2 to the navigation server 2 in advance.

By doing so, when the vehicle-mounted navigation device 1 (the information distribution setting unit 103) transmits an information distribution start request to the navigation server 3, the navigation server 3 can distribute the facility information on recommended facilities located near the current vehicle position and the traveling route to the portable terminals 2 corresponding to the user IDs belonging to the same user group.

As described above, the user IDs belonging to the same user group as the vehicle ID may be set by the vehicle-mounted navigation device 1 (the group user setting unit 106).

<Portable Terminal Facility Setting Unit 204>

The portable terminal facility setting unit 204 receives facility information on recommended facilities located near the current vehicle position and the traveling route, for example, distributed from the navigation server 3 via the wireless unit 22. As described above, the facility information is distributed at a predetermined time interval (for example, every five minutes) for a predetermined period (for example, 30 minutes).

Here, as will be described later, the facility information may include, for example, facility identification information, a facility name, a facility category, a facility telephone number, a facility address (for example, position information specified by latitude, longitude, and the like), information on goods and services or the like provided by the facility, vacancy information, coupon issuance information, and the like.

For example, as illustrated in FIG. 7B, the portable terminal facility setting unit 204 can display the position of a facility on a map around the current position of the portable terminal 2 on the display unit 24 based on the distributed facility information.

Moreover, the portable terminal facility setting unit 204 can display the distributed facility information (for example, information on goods and services or the like provided by a facility, vacancy information, coupon issuance information, and the like) on the display unit 24 in a scrollable manner in response to an instruction such as a user operation on a touch panel or an operation on the input unit 25.

Figure 7C:
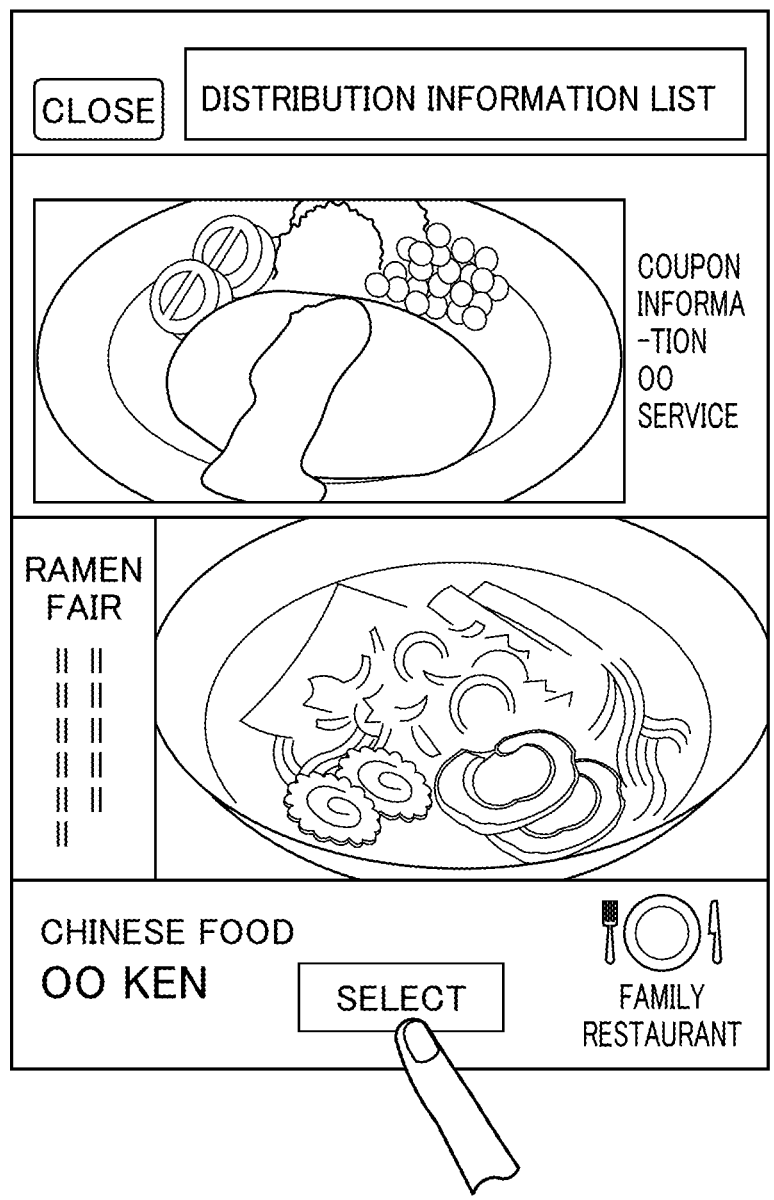
FIG. 7C is a diagram illustrating an example of a screen for displaying distributed facility information, displayed on the portable terminal 2.

For example, as illustrated in FIG. 7C, the portable terminal facility setting unit 204 can allow the user to select a stopover facility among the facilities displayed in a scrollable manner. The portable terminal facility setting unit 204 can transmit the facility selected by the user to the navigation server 3 via the wireless unit 22.

The portable terminal facility setting unit 204 stores the coupon information and the like of the selected facility in the storage unit of the portable terminal 2.

By doing so, when the user visits the facility, by displaying the coupon information of the facility on the display unit 24, the user can enjoy special treatment described in the coupon information.

Figure 7D:
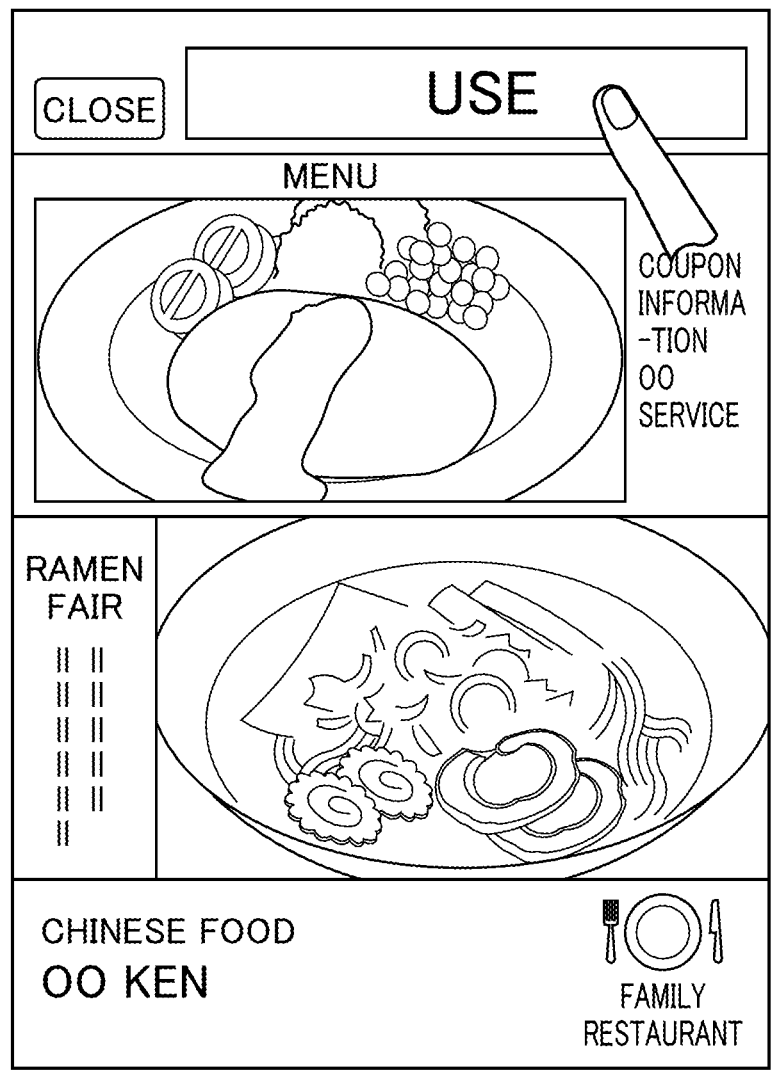
FIG. 7D is a diagram illustrating an example of a screen for displaying facility information (coupon information or the like), displayed on the portable terminal 2 at a facility.
Figure 7E:
FIG. 7E is a diagram illustrating an example of a screen for displaying a coupon use history of a user, displayed on the portable terminal 2.

Moreover, for example, as illustrated in FIG. 7D, when the user touches on a use button, coupon use history information (for example, a user ID, coupon information, current location information, time information, and the like) is transmitted to the navigation server 3 via the wireless unit 12.

<Portable Terminal Route Guidance Unit 205>

The portable terminal route guidance unit 205 can receive route information in which the facility selected by the portable terminal facility setting unit 204 (or the vehicle-mounted navigation device 1 (the facility setting unit 104)) is set as a destination via the wireless unit 22. The portable terminal route guidance unit 205 can execute route guidance based on the received route information.

When route guidance by the portable terminal 2 starts, the route guidance can be continuously provided even when the user leaves the vehicle and travels by walk or using a public transportation.

As another embodiment, the route information may be calculated by the portable terminal 2 (for example, the portable terminal route guidance unit 205) instead of receiving the same from the navigation server 3.

When the route guidance by the route guidance unit 205 of the portable terminal 2 is not used, the task of the portable terminal route guidance unit 205 may end.

Next, the navigation server 3 will be described.

<Navigation Server 3>

Figure 4:
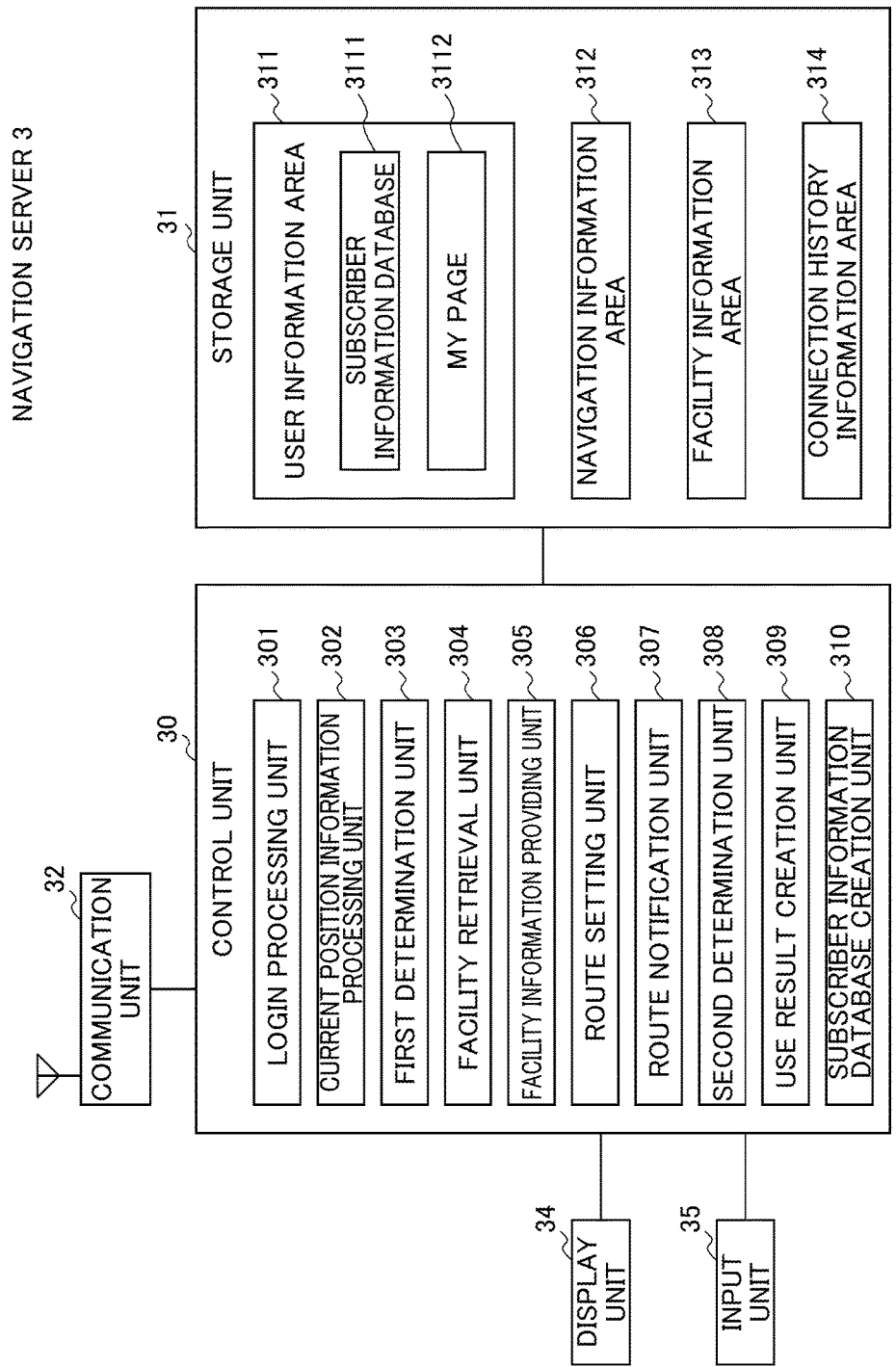
FIG. 4 is a diagram illustrating a configuration of a navigation server 3.

As illustrated in FIG. 4, the navigation server 3 at least includes a control unit 30, a storage unit 31, and a communication unit 32 and may further include a display unit 34 and an input unit 35 as necessary.

The control unit 30 is configured as a processor including a CPU, a RAM, a ROM, an I/O, and the like and control is performed on each control unit The CPU executes navigation programs read from the RAM, the ROM, or the storage unit 31, and during execution of the programs, reads information from the RAM, the ROM, and the storage unit 31, writes information to the RAM and the storage unit 31, and exchanges signals with the communication unit 32.

The details thereof will be described later.

The storage unit 31 is configured as a semiconductor memory, a hard disk drive, or the like and stores various items of information including an operating system (OS) and software called applications. Due to this, the storage unit 31 has secured therein various storage areas including a user information area 311, a navigation information area 312, a facility information area 313, and a connection history information area 314.

The user information area 311 of the storage unit 31 stores a subscriber information database 3111 that manages vehicle information (for example, a vehicle type, a vehicle number plate, a vehicle body frame number, and the like) of each "vehicle ID" and manages user information (for example, a family structure, an age structure, a current address, and the like) of each "user ID".

The subscriber information database 3111 manages vehicle IDs and user IDs belonging to the same user group.

Moreover, the user information area 311 of the storage unit 31 stores a my page 3111 (including destination setting information of a facility set as a destination or a stopover place, a use state of the facility, and the like for each user or each vehicle) set to each user ID or each vehicle ID of the portable terminal 2.

The navigation information area 312 of the storage unit 31 stores map information, road link information, and the like for navigation in advance. The map information includes road network data and the like including display map data for displaying a background such as roads and road maps, position information of nodes (for example, intersections, curves, endpoints, and the like) and type information thereof, position information of links which are routes connecting respective nodes and type information thereof, and link cost data and the like relating to cost information (for example, distance, required time, and the like) of all links.

Moreover, the navigation information area 312 of the storage unit 31 stores transportation information received from a transportation information sensor or the like together with the record time at which the transportation information is received. The transportation information includes, for example, factors that determine a travel cost, such as the number of traveling vehicles, the required travel time, congestion information, traffic control information, and weather information of each link. Furthermore, past transportation information and the like of links may be recorded.

The facility information area 313 of the storage unit 31 stores identification information (hereinafter also referred to as a "facility ID") of a facility, a facility name, a facility category, a facility telephone number, a facility address, facility business hours, position information specified by latitude, longitude, and the like, menus provided by a facility if the facility is a restaurant, facility information on goods and services or the like, vacancy information, and facility information including coupon issuance information and the like.

Moreover, the facility information area 313 of the storage unit 31 stores a facility state (for example, reservation information or the like indicating a reservation state, a vacancy state, and the like of a facility for each time period of the facility and each user) for each facility ID.

Furthermore, the facility information area 313 of the storage unit 31 stores coupon information which is discount information such as an electronic coupon provided by a facility for each facility ID.

Furthermore, the facility information area 313 of the storage unit 31 stores distribution conditions (for example, a valid period of the facility information, a distribution time period of the facility information, and the like) of the facility information for each facility ID.

The content (for example, a valid period of the facility information, distribution image information, goods and services information, coupon information, vacancy information, and the like) of the facility information distributed by the navigation server 3 and the distribution conditions (for example, a valid period of the facility information, a distribution time period of the facility information, and the like) of the facility information can be input and updated from the facility terminal 4 on a realtime basis.

Moreover, the facility information area 313 of the storage unit 31 stores customer attraction result information (for example, customer attraction information, coupon use information, and the like guided to the facility by the distribution information) calculated for each facility. These items of information can be checked from the facility terminal 4.

The connection history information area 314 of the storage unit 31 stores connection history records that manage position information, time information, destination information, a traveling direction of a vehicle (or the portable terminal 2), and the like periodically transmitted from the vehicle-mounted navigation device 1 mounted on the vehicle and the portable terminal 2 for each user ID and each vehicle ID.

The communication unit 32 has a communication protocol capable of performing wireless communication, such as 3G and LTE when transmitting and receiving information to and from the vehicle-mounted navigation device 1 and the portable terminal 2. Moreover, the communication unit 32 has a communication protocol capable of performing cable communication (for example, the Internet line or the like) or wireless communication when transmitting and receiving information to and from the facility terminal 4.

The control unit 30 executes respective programs for navigation to allow the navigation server 3 to function as predetermined means (hereinafter collectively referred to as a "navigation control unit").

Moreover, the control unit 30 executes respective programs for navigation to allow the navigation server 3 to execute predetermined steps (hereinafter collectively referred to as a "navigation control step").

Hereinafter, the functions of the control unit 30 will be described from the viewpoint of a navigation control unit. The description based on the viewpoint of the navigation control step (method) will not be provided since the same description is applied to the navigation control step by replacing "unit" with "step".

As illustrated in FIG. 4, the control unit 30 includes a login processing unit 301, a current position information processing unit 302, a first determination unit 303, a facility retrieval unit 304, a facility information providing unit 305, a route setting unit 306, a route notification unit 307, a second determination unit 308, a use result creation unit 309, and a subscriber information database creation unit 310.

<Login Processing Unit 301>

The login processing unit 301 executes a login process from the vehicle-mounted navigation device 1 or the portable terminal 2 to perform a process of connecting to the vehicle-mounted navigation device 1 or the portable terminal 2 and creates a connection history record for managing the position information, the time information, the traveling direction, the destination information, and the like transmitted from the vehicle-mounted navigation device 1 or the portable terminal 2 in the connection history information area 314 in correlation with the same user group based on the subscriber information database 3111.

By doing so, the navigation server 3 can manage the connection history record of the vehicle-mounted navigation device 1 or the portable terminal 2 belonging to the same user group in an integrated manner.

Moreover, the login processing unit 301 executes a login process from the facility terminal 4.

<Current Position Information Processing Unit 302>

The current position information processing unit 302 updates the connection history record by adding the current position information, the time information, the vehicle traveling direction, and the like periodically transmitted from the vehicle-mounted navigation device 1 and the current position information, the time information, the traveling direction of the portable terminal 2, and the like periodically transmitted from the portable terminal 2.

Moreover, in a period before the ignition switch is turned off (the engine is stopped) after the vehicle arrives at a destination, the current position information, the time information, the vehicle traveling direction, and the like transmitted from the vehicle-mounted navigation device 1 are added to the connection history record to update the connection history record.

<First Determination Unit 303>

The first determination unit 303 determines whether the portable terminal 2 belonging to the same user group as the vehicle that has transmitted the information distribution start request to the navigation server 3 is present inside the vehicle.

Specifically, the first determination unit 303 determines whether the portable terminal 2 (the user ID) belonging to the same user group as the vehicle that has transmitted the information distribution start request is connected based on the connection history record stored in the connection history information area 314.

When the portable terminal 2 (the user ID) belonging to the same user group as the vehicle that has transmitted the information distribution start request is not connected, it is determined that the portable terminal 2 is not present inside the vehicle.

When the portable terminal 2 (the user ID) belonging to the same user group as the vehicle that has transmitted the information distribution start request is connected, it is further determined whether a difference between the position of the vehicle-mounted navigation device 1 and the position of the portable terminal 2 belonging to the same user group at the same time point is within a predetermined threshold (for example, within 5 m) based on the connection history record.

When the difference between the position of the vehicle-mounted navigation device 1 and the position of the portable terminal 2 belonging to the same user group at the same time point is within a predetermined threshold, it is determined that the portable terminal 2 is present inside the vehicle.

When the difference between the position of the vehicle-mounted navigation device 1 and the position of the portable terminal 2 belonging to the same user group at the same time point exceeds the predetermined threshold, it is determined that the portable terminal 2 is not present inside the vehicle.

The threshold can be appropriately set by taking the precision of the position information detected by a GPS sensor, an arrangement of occupants in the vehicle, a time error, and the like into consideration.

<Facility Retrieval Unit 304>

The facility retrieval unit 304 extracts a plurality of facilities located near the current vehicle position and the current position in the traveling direction from the current position using the facility information stored in the facility information area 313 of the storage unit 31 in response to the information distribution start request received from the vehicle-mounted navigation device 1 via the communication unit 32. In selection, the traveling direction transmitted from the vehicle can be used. In this case, it is possible to prevent a facility which the vehicle needs to turn back to reach from being suggested as a candidate.

Here, a facility being located near the current vehicle position means that the facility is present within a predetermined distance from the current vehicle position, for example. Moreover, a facility being located near the current position in the traveling direction from the current position means that, for example, the facility is present within a predetermined distance range from the current vehicle position and a predetermined distance range from a point on a passing route from the current vehicle position to a target position.

Further, when destination information is received from a vehicle, the facility retrieval unit 304 can extract a plurality of facilities present near a passing route from the current position to a destination. For example, the facility retrieval unit 304 can extract information on a plurality of items of candidate facilities located in the former half, the middle, the latter half, or the like of a route from the current position to a destination or near a route to a destination for each time period of an expected arrival time.

As described above, the facility retrieval unit 304 extracts facility information on recommended facilities located near the current vehicle position and the traveling route, for example, at a predetermined time interval (for example, every five minutes) for a predetermined period (for example, 30 minutes). In this case, facilities which have already been retrieved and extracted may be excluded. By doing so, it is possible to obviate redundancy.

<Facility Information Providing Unit 305>

The facility information providing unit 305 transmits the facility information extracted by the facility retrieval unit 304 to the vehicle-mounted navigation device 1 via the communication unit 32. Furthermore, when the first determination unit 303 determines that the portable terminal 2 (being connected to the navigation server 3) belonging to the same user group as the vehicle-mounted navigation device 1 that has transmitted the information distribution start request is located inside the vehicle, the facility information retrieved and extracted by the facility retrieval unit 304 is also transmitted to the portable terminal 2 via the communication unit 32.

When the first determination unit 303 determines that the portable terminal 2 (being connected to the navigation server 3) belonging to the same user group as the vehicle-mounted navigation device 1 that has transmitted the information distribution start request is not located inside the vehicle, the facility information providing unit 305 transmits the facility information retrieved and extracted by the facility retrieval unit 304 to the vehicle-mounted navigation device 1 only that has transmitted the information distribution start request.

As described above, the facility information providing unit 305 transmits the facility information retrieved and extracted by the facility retrieval unit 304 at a predetermined time interval (for example, every five minutes) for a predetermined period (for example, 30 minutes).

<Route Setting Unit 306>

In response to the position information of at least one facilities selected among items of facility information transmitted by the facility information providing unit 305 from the portable terminal 2 (or the vehicle-mounted navigation device 1 mounted on a stopped vehicle), the route setting unit 306 sets the position information of the selected at least one facility as a destination.

The route setting unit 306 calculates route information from the current vehicle position to a facility set as the destination. When the route information is calculated, an optimal route is calculated using the transportation information and the map information stored in the navigation area of the storage unit 31 by taking various conditions such as an arrival time, the use of a toll road, and the like into consideration.

Here, the optimal route is, for example, a route which best satisfies a target condition designated by the user such as a route in which the arrival time is the quickest, a route in which the distance is the shortest, a route in which a general road is prioritized, a route in which a toll road is prioritized, a route in which the toll of a toll road or the like is the smallest, or a route in which the $CO_2$ emission is the smallest.

<Route Notification Unit 307>

The route notification unit 307 transmits the route information calculated by the route setting unit 306 to the vehicle-mounted navigation device 1 via the communication unit 32.

In this case, the route notification unit 307 stores the facility set as a destination and a vehicle ID (or a user ID) in the storage unit 31 in correlation.

Moreover, when the portable terminal 2 which is determined to be located inside the vehicle by the first determination unit 303 and which belongs to the same user group as the vehicle-mounted navigation device 1 is in a connected state to the navigation server 3, the route notification unit 307 can distribute the route information to the portable terminal 2. In this case, even the user leaves the vehicle 1 and travels by walk or using a public transportation, the route guidance can be continued by the portable terminal 2.

The route notification unit 307 can notify the facility terminal 4 of the facility set as the destination of the customer information (for example, the information on the vehicle or the user that has set the facility as the destination, the number of visiting persons, an expected arrival time, information on whether another facility is set as a destination, and the like).

By doing so, the facility set as the destination of the route can estimate the number of visitors.

Another Embodiment

As another embodiment, when the vehicle-mounted navigation device 1 calculates routes, the route setting unit 306 sets the position information of the selected at least one facility as a destination, and the route notification unit 307 transmits the facility information including the position information of the facility set as the destination to the vehicle-mounted navigation device 1 and stores the facility and the vehicle ID (or the user ID) in the storage unit 31 in correlation.

By doing so, the vehicle-mounted navigation device 1 can calculate route information from the current vehicle position to the facility set as the destination.

In this case, the route notification unit 307 can acquire an expected time to arrive at the destination from the vehicle-mounted navigation device 1 and notify the facility terminal 4 of the facility set as the destination of the customer information (for example, the information on the vehicle or the user that has set the facility as the destination, the number of visiting persons, an expected arrival time, information on whether another facility is set as a destination, and the like).

<Second Determination Unit 308>

The second determination unit 308 determines whether the vehicle which has set the facility selected by the portable terminal 2 as the destination of the route has really stayed in the facility.

Specifically, in response to the current vehicle position information calculated by the sensor unit 13 and the current time information or the like acquired from the clock unit (not illustrated) from the vehicle-mounted navigation device 1 via the communication unit 32 at a time point when the ignition switch of the vehicle is turned on (the engine is started), the vehicle-mounted navigation device 1 is automatically activated, and a login process is executed, the second determination unit 308 determines whether the vehicle is a vehicle which has set the facility selected by the portable terminal 2 as the destination of the route when the vehicle travels near the facility.

When the vehicle is the vehicle which has set the facility selected by the portable terminal 2 as the destination of the route when the vehicle travels near the facility, the current position received from the vehicle is near the position of the facility set as the destination of the route, and, for example, the address of the current position received from the vehicle is identical to the address of the facility set as the destination, or the difference between the current position received from the vehicle and the position of the facility set as the destination of the route is within a predetermined second threshold (for example, 50 m), it is determined that the vehicle has stayed (visited) in the facility set as the destination of the route.

When it is determined that the vehicle has stayed in the facility set as the destination of the route, for example, the difference between the present ignition ON time and the previous ignition OFF time can be calculated as the staying time in the facility.

When the current position received from the vehicle is not near the position of the facility set as the destination of the route, it is determined that the vehicle has not stayed (visited) in the facility set as the destination of the route.

Based on the determination result, the navigation server 3 can perform a success reward (charge) process on the facility, for example, for guiding the user to the facility.

In execution of the second determination unit 308, for example, a set of items of history information stored in the storage unit 31 in which the vehicle ID (or the user ID) and the facility set as the destination are stored in correlation and a set of connection history records including the current vehicle position information during ignition-ON immediately after route guidance of the vehicle may be matched based on the vehicle ID on a daily basis so that batch processing for the day can be realized.

<Use Result Creation Unit 309>

The use result creation unit 309 can calculate the customer information (for example, the use date, the distributed facility information, the vehicle or the user that has set the facility as the destination of the route, the vehicle or the user that as set the facility as the a destination and visited the facility, and the vehicle or the user that has set the facility as the destination of the route but has not visited the facility) of the customer guided to the facility by the navigation system, the coupon use information of the customer, the sales information, and the like for respective facilities on each use date based on the determination of the second determination unit 308 and store the calculated information in the facility information area of the storage unit 31. Moreover, the number of cases obtained by statistically processing these items of information may be created and stored.

Similarly, the use result creation unit 309 can calculate the use result information (for example, the use date, a facility that is set as the destination of the route, and a facility that is set as the destination of the route but is not visited) of the navigation system and the coupon use information or the like of the facility for respective vehicle IDs or user IDs and store the calculated information, for example, in a my page corresponding to the user of the user information area 311 of the storage unit 31.

<Subscriber Information Database Creation Unit 310>

The subscriber information database creation unit 310 creates and stores vehicle information (for example, a vehicle ID, a vehicle type, a vehicle number plate, and the like) and user information (for example, a user ID, a family structure, an age structure, a current address, and the like) in advance. Moreover, vehicle IDs and user IDs belonging to the same user group are stored in advance in correlation.

Moreover, the subscriber information database creation unit 310 can set user IDs belonging to the same user group as the vehicle ID based on a request from the vehicle-mounted navigation device 1 or the portable terminal 2.

<Facility Terminal 4>

Next, the facility terminal 4 will be described.

Figure 5:
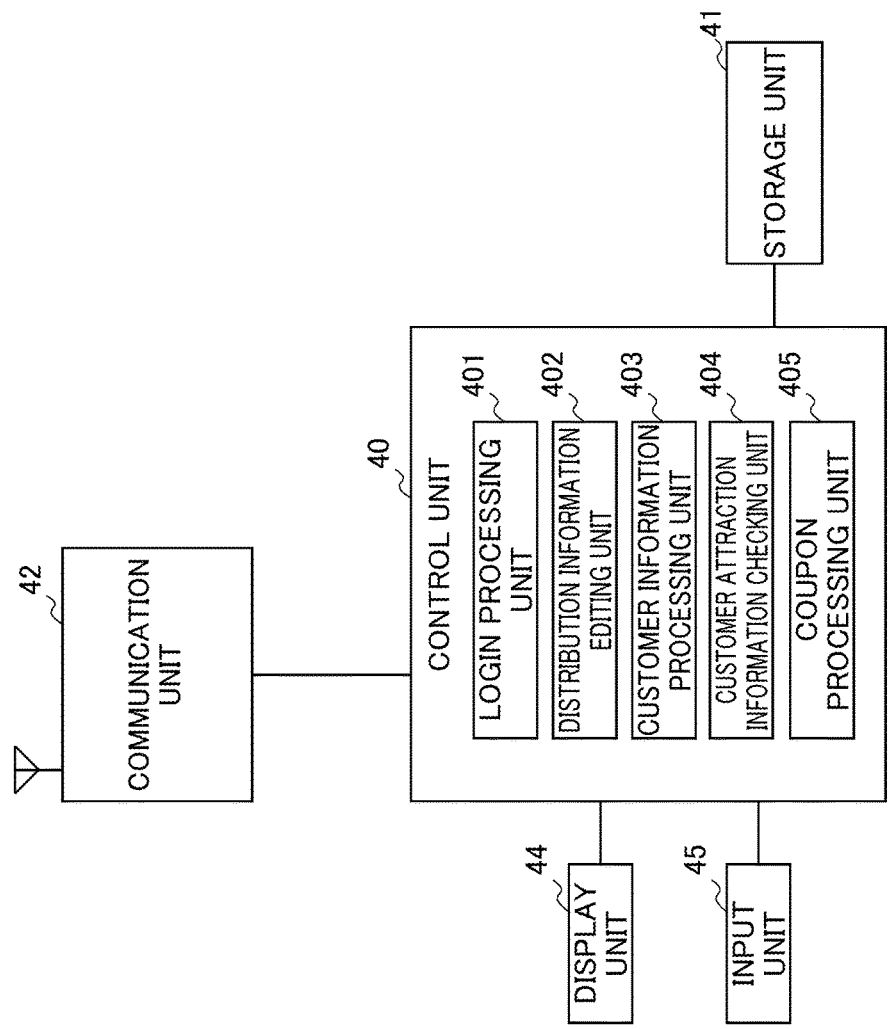
FIG. 5 is a diagram illustrating a configuration of a facility terminal 4.

As illustrated in FIG. 5, the facility terminal 42 at least includes a control unit 40, a storage unit 41, a communication unit 42, a display unit 44, and an input unit 45. The respective units have the same configurations as the respective corresponding units of the portable terminal 2 and the navigation server 3, for example.

The control unit 40 executes respective programs to allow the facility terminal 4 to function as predetermined means (hereinafter collectively referred to as a "facility management assist control unit").

Moreover, the control unit 40 executes respective programs for facility management assist control to allow the facility terminal 4 to execute predetermined steps (hereinafter collectively referred to as a "facility management assist control step").

Hereinafter, the functions of the control unit 40 will be described from the viewpoint of the facility management assist control unit. The description based on the viewpoint of the facility management assist control step (method) will not be provided since the same description is applied to the facility management assist control step by replacing "unit" with "step".

As illustrated in FIG. 5, the control unit 40 includes a login processing unit 401, a distribution information editing unit 402, a customer information processing unit 403, a customer attraction information checking unit 404, and a coupon processing unit 405.

<Login Processing Unit 401>

The login processing unit 401 executes a login process to the navigation server 3 using the identification number (the facility ID) for identifying a facility and a password, for example.

<Distribution Information Editing Unit 402>

The distribution information editing unit 402 can access the navigation server 3 to allow an administrator of a facility, for example, to input and update the content (for example, a valid period of the facility information, distribution image information, goods and services information, coupon information, vacancy information, and the like) of the facility information distributed by the navigation server 3 and the distribution conditions (for example, a valid period of the facility information, a distribution time period of the facility information, and the like) of the facility information, stored in the navigation server 3 (the facility information area 313 of the storage unit 31) on a realtime basis.

By doing so, the administrator of the facility, for example, can set the distribution condition of the facility information so that the navigation server 3 does not distribute the facility information when the facility is congested.

Moreover, for example, the administrator of the facility can promote sales by setting the distribution image information, the coupon information, the vacancy information, and the like in realtime.

<Customer Information Processing Unit 403>

The customer information processing unit 403 can receive the customer information (for example, the information on the vehicle or the user that has set the facility as the destination, the number of visiting persons, an expected arrival time, information on whether another facility is set as a destination, and the like) from the navigation server 3 (the route notification unit 307).

By doing so, for example, the administrator of the facility can estimate the number of visitors.

<Customer Attraction Information Checking Unit 404>

The customer attraction information checking unit 404 can access the navigation server 3 to check the customer information (for example, the use date, the distributed facility information, the vehicle or the user that has set the facility as the destination of the route, the vehicle or the user that as set the facility as the a destination and visited the facility, and the vehicle or the user that has set the facility as the destination of the route but has not visited the facility) of the customer guided to the facility by the navigation system, the coupon use information of the customer, the sales information, and the like on each use date.

Moreover, the number of cases obtained by statistically processing these items of information may be checked.

By doing so, for example, the administrator of the facility can create the facility information more effective for attracting customers.

<Coupon Processing Unit 405>

The coupon processing unit 405 reads the coupon information and the like of the facility, displayed on the display unit 24 of the portable terminal 2 and performs a special treatment process such as a discount, for example.

Hereinabove, the embodiment of the functional units of the navigation system 100 of the present invention has been described based on the configuration of the vehicle-mounted navigation device 1 mounted on the vehicle, the portable terminal 2, the navigation server 3, and the facility terminal 4. However, the embodiment of the respective functional units of the navigation system of the present invention may be deployed to be executed by one computer or a number of computers distributed to one location or a plurality of locations and connected to each other by a communication network. Moreover, the respective functional units may be configured using a plurality of virtual computers on a cloud.

For example, when the navigation server 3 is processed by a plurality of computers in a distributed manner, the respective functions of the navigation server 3 can be executed by any computer. Therefore, a skilled person can appropriately design allocation to computers, of the respective functions of the navigation server 3.

(Operation of Navigation System 100)

Hereinabove, the configuration of the navigation system 100 has been described. Next, the operation of the navigation system 100 will be described. FIGS. 6A to 6D are flowcharts illustrating the flow of a process of the navigation system 100 and FIGS. 7A to 7E are display examples of a navigation screen displayed on the vehicle-mounted navigation device 1 or the portable terminal 2.

First, navigation control will be described with reference to FIGS. 6A to 6D.

In step S101, the vehicle-mounted navigation device 1 is automatically activated when a driver turns on the ignition switch of the vehicle (starts the engine), and the vehicle-mounted navigation device 1 (the connection processing unit 101) transmits a login request (connection request) to the navigation server 3 using a vehicle ID and a password and transmits a current vehicle position and a current time or the like.

In step S201, when the user activates the portable terminal route setting and guidance application, the portable terminal 2 (the portable terminal 2 connection processing unit 201) turns on the GPS sensor, transmits a login request (connection request) to the navigation server 3 using a user ID and a password, and transmits a current position of the portable terminal 2 and the current time or the like.

In step S301, the navigation server 3 (the login processing unit 301) performs a connection process to the vehicle-mounted navigation device 1 or the portable terminal 2 and creates a connection history record for managing the current position and the current time or the like received from the vehicle-mounted navigation device 1 or the portable terminal 2 in the connection history information area 314 based on the subscriber information database 311 in correlation with the same user group.

In step S302, the navigation server 3 (the second determination unit 308) determines whether the vehicle corresponding to the vehicle ID is a vehicle which has set a predetermined facility as a destination based on the distributed facility information when the vehicle travels near the facility. Specifically, the navigation server 3 (the second determination unit 308) determines whether history information (for example, a vehicle ID, a destination setting date, a destination facility ID, and the like) indicating that a predetermined facility is set as a destination based on the facility information distributed by the vehicle is recorded in the storage unit 31. When the history information indicating that the predetermined facility is set as a destination based on the facility information distributed by the vehicle is recorded (Yes), the flow proceeds to step S303. When the history information indicating that the predetermined facility is set as a destination based on the facility information distributed by the vehicle is not recorded (No), the flow proceeds to step S304.

In step S303, the navigation server 3 performs a visit determination recording process and the flow proceeds to step S304.

Figure 6A:
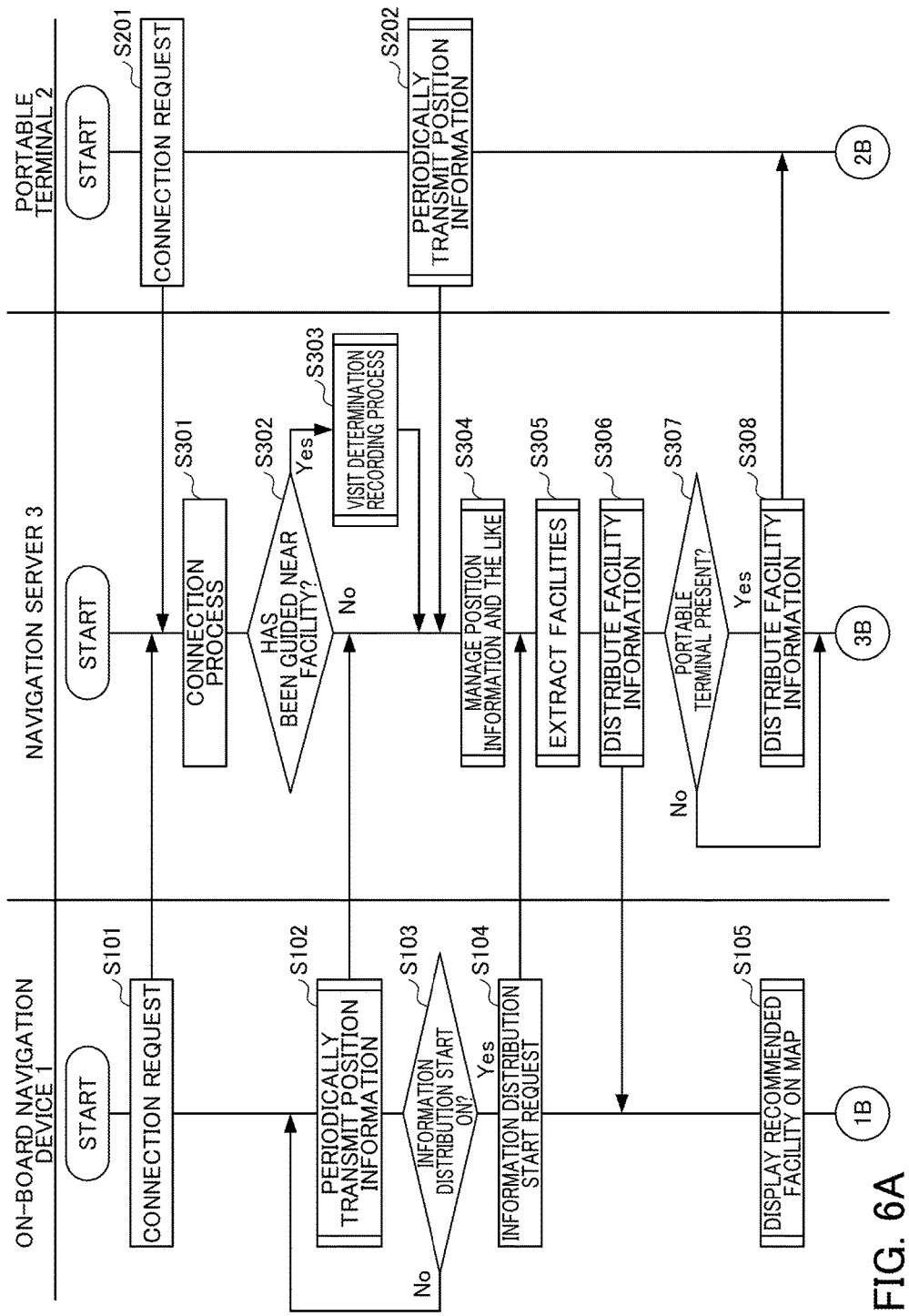
FIG. 6A is a flowchart illustrating the flow of a process of the navigation system 100.
Figure 6B:
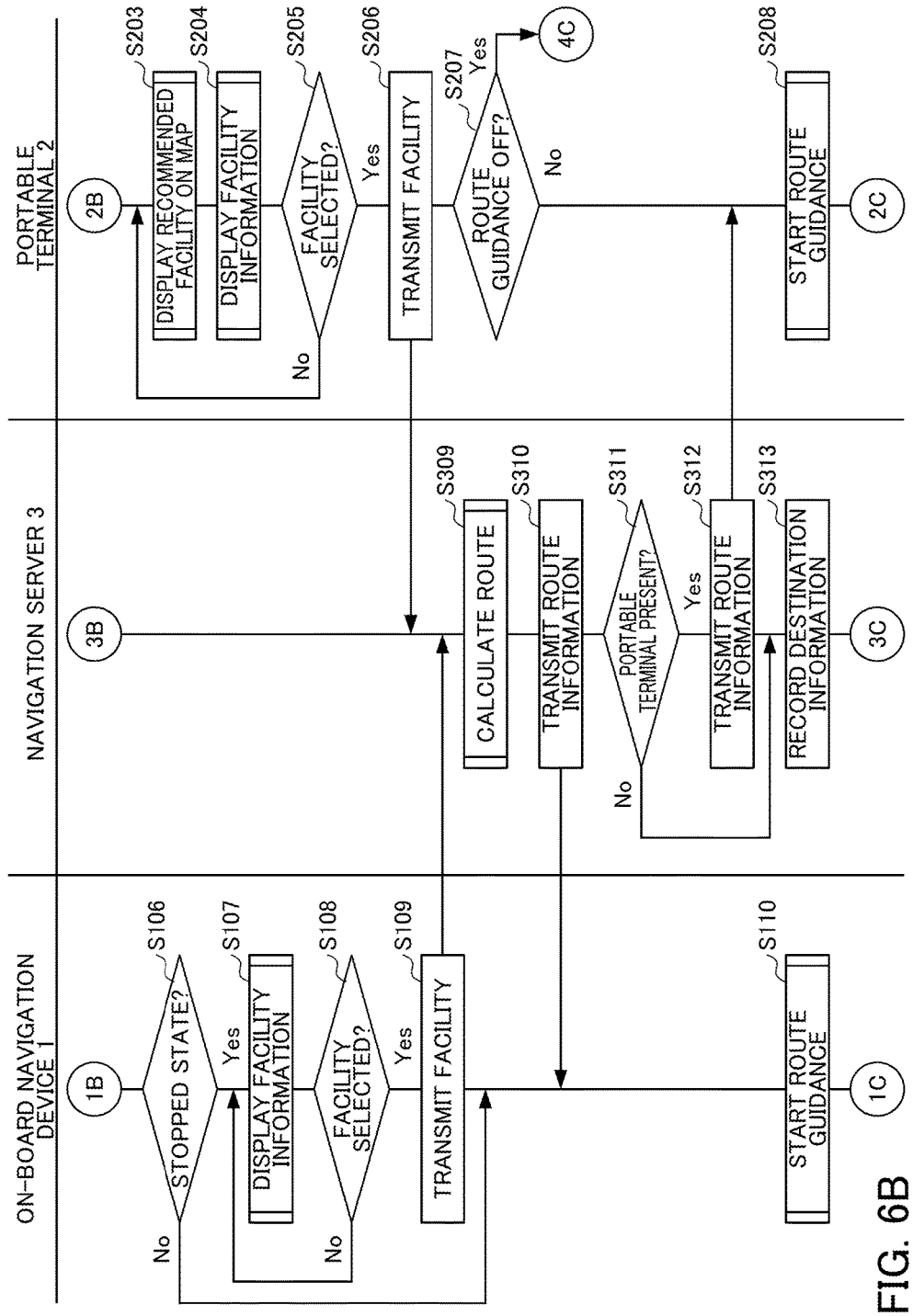
FIG. 6B is a flowchart illustrating the flow of a process of the navigation system 100.
Figure 6C:
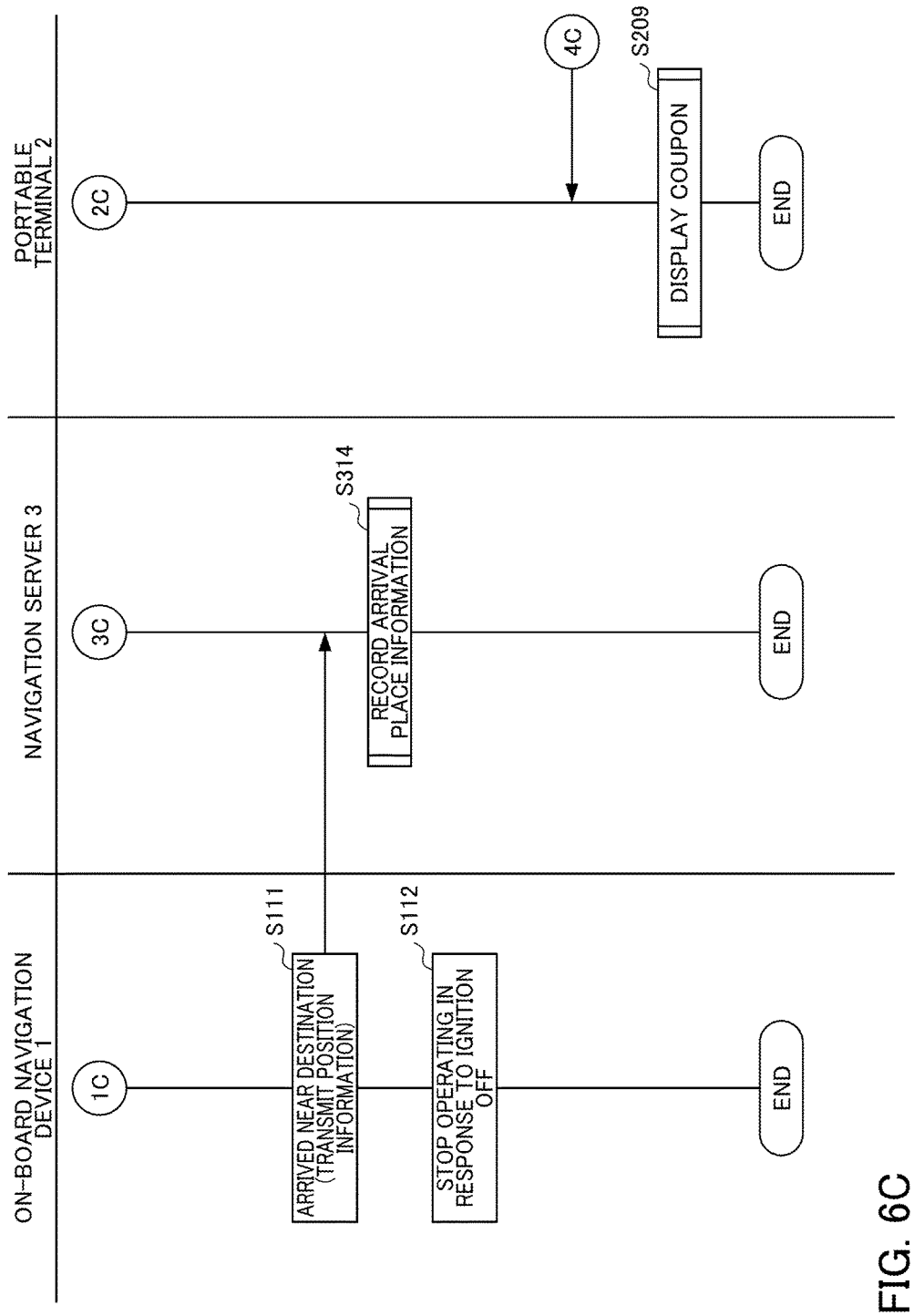
FIG. 6C is a flowchart illustrating the flow of a process of the navigation system 100.
Figure 6D:
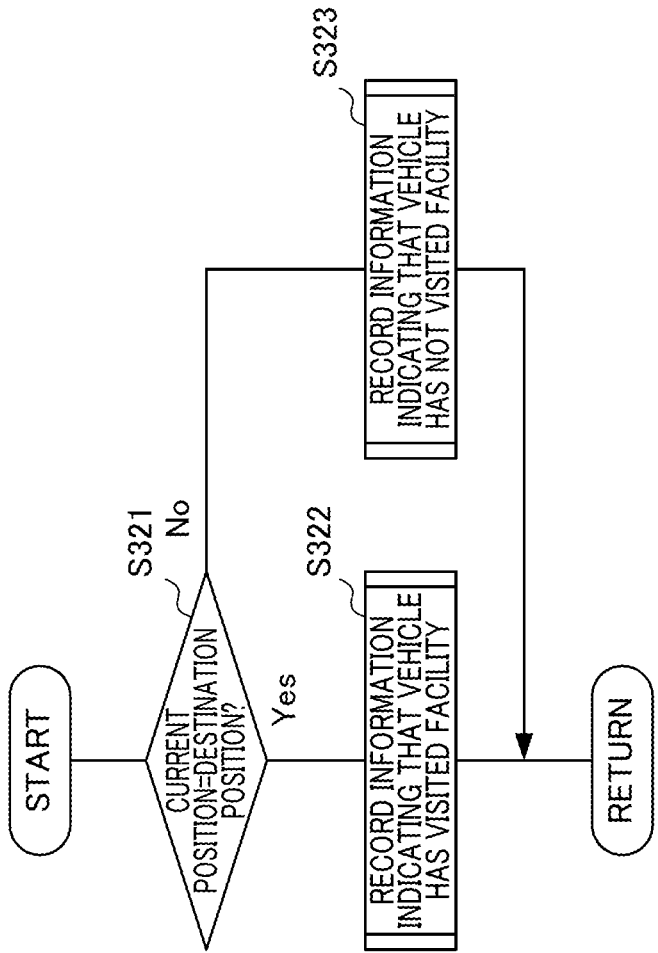
FIG. 6D is a flowchart illustrating the flow of a process of the navigation system 100.

Here, the flow of a visit determination recording process will be described with reference to FIG. 6D.

In step S321, the navigation server 3 (the second determination unit 308) determines whether the current position received from the vehicle-mounted navigation device 1 (the connection processing unit 101) which is automatically activated when the driver turns on the ignition switch of the vehicle (starts the engine) is near the position of the facility set as the previous destination. When the current position is near the position of the facility set as the previous destination (Yes), the flow proceeds to step S322. When the current position is not near the position of the facility set as the previous destination (No), the flow proceeds to step S323.

In step S322, the navigation server 3 (the second determination unit 308) records history information (for example, a vehicle ID, a facility ID, a visiting date, a staying time, and the like) indicating that the vehicle has visited the facility and the flow returns to a main routine.

In step S323, when the current position is not near the position of the facility which is set as the previous destination, the navigation server 3 (the second determination unit 308) records history information (a vehicle ID, a user ID, a facility ID, a guidance date, and the like) indicating that the vehicle (and the user) has not visited the facility and the flow returns to a main routine.

As described above, the visit determination recording process may be realized, for example, as batch processing for the day by matching a set of items of history information stored in the storage unit 31 in which the vehicle ID (or the user ID) and the facility set as the destination are stored in correlation and a set of connection history records including the current vehicle position information during ignition-ON immediately after route guidance of the vehicle based on the vehicle ID on a daily basis rather than performing the same on a realtime basis like step S302 and step S303 (a visit determination process).

In step S102, the vehicle-mounted navigation device 1 (the position information updating unit 102) periodically transmits the current vehicle position information, the current time information, the traveling direction, and the like to the navigation server 3.

In step S202, the portable terminal 2 (the portable terminal position information updating unit 202) transmits the current position information of the portable terminal 2, the current time information, the traveling direction, and the like to the navigation server 3.

In step S304, upon receiving information such as the current position information, the current time information, the traveling direction, and the like from the vehicle-mounted navigation device 1 or the portable terminal 2, the navigation server 3 (the current position information processing unit 302) stores the information by adding the same to the connection history record.

In step S103, the vehicle-mounted navigation device 1 (the information distribution setting unit 103) determines whether the user has turned on an information distribution function. When the user has turned on the information distribution function (Yes), the flow proceeds to step S104. When the user has not turned on the information distribution function (No), the flow proceeds to step S102.

In step S104, the vehicle-mounted navigation device 1 (the information distribution setting unit 103) transmits an information distribution start request including the vehicle ID, the current vehicle position information, the current time information, the vehicle traveling direction, and the like to the navigation server 3.

In step S305, when an information distribution start request including the vehicle ID, the current vehicle position information, the current time information, the vehicle traveling direction, and the like is received from the vehicle-mounted navigation device 1, the navigation server 3 (the facility retrieval unit 304) extracts a plurality of facilities located near the current vehicle position, a plurality of facilities located near the current position in the traveling direction from the current position, or a plurality of facilities located near a route from the current position to a target position using the facility information stored in the facility information area of the storage unit 31 at a predetermined time interval (for example, every five minutes) (for a predetermined maximum period (for example, 30 minutes)) until the selected facility information is received.

In step S306, the navigation server 3 (the facility information providing unit 305) transmits the facility information retrieved and extracted by the facility retrieval unit 304 to the vehicle-mounted navigation device 1.

In step S307, the navigation server 3 (the first determination unit 303) determines whether the portable terminal 2 belonging to the same user group as the vehicle received from the vehicle-mounted navigation device 1 is connected to the navigation server 3 and is present inside the vehicle. When the portable terminal 2 belonging to the same user group as the vehicle is connected to the navigation server 3 and is present inside the vehicle (Yes), the flow proceeds to step S308. When the portable terminal 2 belonging to the same user group as the vehicle is not connected to the navigation server 3 or is not present inside the vehicle (No), the flow proceeds to step S309.

In step S308, the navigation server 3 (the facility information providing unit 305) transmits the facility information to the portable terminal 2 belonging to the same user group as the vehicle.

The navigation server 3 (the facility information providing unit 305) transmits the facility information retrieved and extracted by the facility retrieval unit 304 at a predetermined time interval (for example, five minutes) (for a predetermined maximum period (for example, 30 minutes)) until the selected facility information is received.

In step S105, the vehicle-mounted navigation device 1 (the facility setting unit 104) displays the location of the facility on the map around the current vehicle position as illustrated in FIG. 7B on the display unit 14 based on the facility information on the recommended facilities present near the current vehicle position received from the navigation server 3 and near the traveling route.

FIG. 7C illustrates an example of a display screen of the facility information displayed on the vehicle-mounted navigation device 1.

In step S106, the vehicle-mounted navigation device 1 determines whether the vehicle is in a stopped state. When the vehicle is in a stopped state (Yes), the flow proceeds to step S107. When the vehicle is in a traveling state (No), the flow proceeds to step S110.

When the vehicle is in a stopped state, in step S107, the vehicle-mounted navigation device 1 (the facility setting unit 104) displays the distributed facility information (for example, information on goods and services or the like provided by the facility, vacancy information, coupon issuance information, and the like) on the display unit 14 in a scrollable manner according to a user's instruction.

FIG. 7C illustrates an example of a display screen of the facility information displayed on the vehicle-mounted navigation device 1.

Although not illustrated in the drawing, when the vehicle is in operation, the facility information distributed from the navigation server 3 can be output from the speaker 16 as a sound.

When the vehicle is in a stopped state, in step S108, the vehicle-mounted navigation device 1 (the facility setting unit 104) determines whether the user has selected a desired facility. When the desired facility is selected (Yes), the flow proceeds to step S109. When the desired facility is not selected (No), the flow proceeds to step S106.

Referring to FIG. 7C, it is possible to display facility information to allow the user to select a facility.

Although not illustrated in the drawing, when the vehicle is in operation, a user can input a facility to the control unit 10 through a voice recognition technique by allowing the user to select facility as a voice via the microphone 17.

When the vehicle is in a stopped state, in step S109, the vehicle-mounted navigation device 1 (the facility setting unit 104) transmits the facility selected by the user to the navigation server 3.

In step S203, the portable terminal 2 (the portable terminal facility setting unit 204) displays the location of the facility on a map around the current vehicle position on the display unit 14 as illustrated in FIG. 7B based on the facility information on a recommended facility present near the current vehicle position received from the navigation server 3 and near the traveling route.

In step S204, the portable terminal 2 (the portable terminal facility setting unit 204) displays the distributed facility information (for example, information on goods and services or the like provided by the facility, vacancy information, coupon issuance information, and the like) on the display unit 24 in a scrollable manner according to a user's instruction.

FIG. 7C illustrates an example of a display screen of the facility information displayed on the portable terminal 2.

In step S205, the portable terminal 2 (the portable terminal facility setting unit 204) determines whether the user has selected a desired facility. When the desired facility is selected (Yes), the flow proceeds to step S206. When the desired facility is not selected (No), the flow proceeds to step S203.

Referring to FIG. 7C, it is possible to display facility information to allow the user to select a facility.

In step S206, the portable terminal 2 (the portable terminal facility setting unit 204) transmits the facility selected by the user to the navigation server 3.

In step S309, the navigation server 3 (the route setting unit 306) sets the position information of the facility selected by the user, received from the portable terminal 2 or the vehicle-mounted navigation device 1 as a destination and calculates a route from the current vehicle position to the destination. When the route is calculated, an optimal route is calculated using the transportation information and the map information stored in the navigation area of the storage unit 31 by taking various conditions such as an arrival time, the use of a toll road, and the like into consideration.

In step S310, the navigation server 3 (the route notification unit 307) transmits the route information calculated by the route setting unit 306 to the vehicle-mounted navigation device 1. Moreover, although not illustrated in the drawing, the navigation server 3 (the route notification unit 307) can notify the facility terminal 4 of the facility set as the destination of the customer information (for example, the information on the vehicle or the user that has set the facility as the destination, the number of visiting persons, an expected arrival time, information on whether another facility is set as a destination, and the like).

In step S311, the navigation server 3 (the first determination unit 303) determines whether the portable terminal 2 belonging to the same user group as the vehicle-mounted navigation device 1 is connected to the navigation server 3 and is present inside the vehicle. When the portable terminal 2 belonging to the same user group as the vehicle-mounted navigation device 1 is connected to the navigation server 3 and is present inside the vehicle (Yes), the flow proceeds to step S312. When the portable terminal 2 belonging to the same user group as the vehicle-mounted navigation device 1 is not connected to the navigation server 3 or is not present inside the vehicle (No), the flow proceeds to step S313.

In step S312, the navigation server 3 (the route notification unit 307) transmits the route information calculated by the route setting unit 306 to the portable terminal 2.

In step S313, the navigation server 3 (the route notification unit 307) records the history information (for example, the vehicle ID, the user ID, the destination setting date, the destination facility information, and the like) indicating the vehicle has set a destination in the storage unit 31.

In step S110, the vehicle-mounted navigation device 1 (the route guidance unit 105) displays route guidance on the display unit 14 according to the route information received from the navigation server 3 and starts route guidance.

In step S207, when the task of the portable terminal route guidance unit 205 is turned off, the flow proceeds to step S209. When the task is not turned off, the flow proceeds to step S208.

In step S208, the portable terminal 2 (the portable terminal route guidance unit 205) displays route guidance on the display unit 24 according to the route information received from the navigation server 3 and starts route guidance.

In step S111, the vehicle-mounted navigation device 1 (the position information updating unit 102) transmits the current vehicle position information, the current time information, the traveling direction, and the like to the navigation server 3 when the vehicle arrives near the destination.

In step S314, the navigation server 3 (the current position information processing unit 302) stores information such as the current position information (arrival place position information), the current time information, the traveling direction, and the like received from the vehicle-mounted navigation device 1 by adding the same to the connection history record.

In step S112, the vehicle-mounted navigation device 1 stops operating when the driver turns off the ignition switch of the vehicle (stops the engine).

In step S209, when the vehicle arrives at the facility set as the destination, as illustrated in FIG. 7D, a coupon for the facility information displayed on the display unit 24 of the portable terminal is displayed on the display unit 24. For example, the user can use the coupon by touching a use button. Moreover, although not illustrated in the drawing, the facility terminal 4 read the coupon to perform a special treatment process such as a discount, for example.

[Modification 1]

Hereinabove, the navigation system 100 according to the first embodiment has been described. In the first embodiment, the navigation server 3 calculates the route information and transmits the route information to the vehicle-mounted navigation device 3. However, as another embodiment, the vehicle-mounted navigation device 1 may receive destination setting information from the navigation server 3 and calculate the route information based on the destination setting information.

<Modification in which Vehicle-Mounted Navigation Device 1 Calculates Route Information>

When the route information is configured to be calculated by the vehicle-mounted navigation device 1, steps S309, S310, S313, and S110 of the operation process flow of the navigation system 100 can be replaced with the following steps.

In step S309, the navigation server 3 (the route setting unit 306) sets the position information of the facility selected by the user, received from the portable terminal 2 or the vehicle-mounted navigation device 1 as a destination.

In step S310, the navigation server 3 (the route notification unit 307) transmits facility information including the position information of the facility set as the destination to the vehicle-mounted navigation device 1.

In step S313, the navigation server 3 (the route notification unit 307) stores the facility information including the position information of the facility and the vehicle ID (or the user ID) in the storage unit 31 in correlation.

Moreover, the navigation server 3 (the route notification unit 307) can acquire an expected time to arrive at the destination from the vehicle-mounted navigation device 1 and notify the facility terminal 4 of the facility set as the destination of the customer information (for example, the information on the vehicle or the user that has set the facility as the destination, the number of visiting persons, an expected arrival time, information on whether another facility is set as a destination, and the like).

In step S110, the vehicle-mounted navigation device 1 (the route guidance unit 105) calculates the route information based on the facility information including the position information of the facility set as the destination, received from the navigation server 3, displays route guidance on the display unit 14, and starts route guidance.

Moreover, the expected time to arrive at the facility is notified to the navigation server 3 (the route notification unit 307).

[Modification 2]

Similarly, in the first embodiment, the navigation server 3 calculates the route information and transmits the route information to the portable terminal 2. However, as another embodiment, the portable terminal 2 may receive destination setting information from the navigation server 3 and calculate the route information based on the destination setting information.

[Modification 3]

In the first embodiment, the navigation server 3 notifies the facility terminal 4 of the facility set as the destination of the customer information (for example, the information on the vehicle or the user that has set the facility as the destination, the number of visiting persons, an expected arrival time, information on whether another facility is set as a destination, and the like). In addition to this, by allowing the portable terminal 2 to reserve or order goods provided by the facility set as the destination to the navigation server 3, the navigation server 3 can notify the facility terminal 4 of the reservation information or the order information as the customer information.

[Modification 4]

In the first embodiment, the visit determination recording process is performed as a type of realtime processing. However, for example on that day, a set of items of history information stored in the storage unit 31 in which the vehicle ID (or the user ID) and the facility set as the destination are stored in correlation and a set of connection history records including the current vehicle position information during ignition-ON immediately after route guidance of the vehicle may be matched based on the vehicle ID on a daily basis so that batch processing for the day can be realized.

[Others]

In the first embodiment, the navigation server 3 is realized as one server. However, as another embodiment, the navigation server 3 may be realized as a distributed processing system in which the respective functions of the navigation server 3 are distributed appropriately to a plurality of servers. Moreover, the respective functions of the navigation server 3 may be realized on a cloud using a virtual server function or the like.

According to the navigation system 100 described above, the following advantages are obtained.

(1) In the navigation system 100 described above, the navigation server 3 transmits the facility information to the vehicle-mounted navigation device 1 and the portable terminal 2 via the wireless unit 32.

Due to this, even when a driver wants to check information on a stopover facility during operation of the vehicle, an occupant of the vehicle can check and select the facility information without the driver stopping the vehicle.

Particularly, since the navigation server 3 determines whether the facility information is to be transmitted to the portable terminal 2 based on the current vehicle position information and the current position information of the portable terminal, the user can easily receive the necessary facility information from the navigation server 3 without inputting complex setting.

(2) According to the navigation server 3 of the above-described embodiment, when the stopover facility is selected by the portable terminal of the occupant of the vehicle, the navigation server 3 transmits the route information in which the selected facility is set as the destination to the vehicle-mounted navigation device 1.

Due to this, the destination is automatically set to the vehicle-mounted navigation device 1 without requiring any special operation of the driver of the vehicle.

(3) The navigation server 3 of the above-described embodiment automatically determines whether the vehicle has stayed in the destination facility based on the ignition ON information of the vehicle received via the communication unit 32, the position information of the vehicle at the ignition ON time, and the position information of the destination facility when the vehicle travels near the facility.

Due to this, since the navigation server 3 automatically determines whether the vehicle has stayed in the facility without requiring any special operation of the user after the vehicle arrives at the destination facility, a success reward (charge) process on the facility, for example, for guiding the user to the facility can be performed easily and fairly.

In the foregoing description, although preferred embodiments of the present invention have been described, the present invention is not to be limited to the afore-mentioned embodiments but may be appropriately modified.

EXPLANATION OF REFERENCE NUMERALS

100: Navigation system
1: Vehicle-mounted navigation device
10: Control unit
101: Connection processing unit
102: Position information updating unit
103: Information distribution setting unit
104: Facility setting unit
105: Route guidance unit
106: Group user setting unit
11: Storage unit
12: Wireless unit
13: Sensor unit
14: Display unit
15: Input unit
2: Portable terminal
20: Control unit
201: Portable terminal connection processing unit
202: Portable terminal position information updating unit
203: Portable terminal group user setting unit
204: Portable terminal facility setting unit
205: Portable terminal route guidance unit
21: Storage unit
22: Wireless unit
23: Sensor unit
24: Display unit
25: Input unit
3: Navigation server
30: Control unit
301: Login processing unit
302: Current position information processing unit
303: First determination unit
304: Facility retrieval unit
305: Facility information providing unit
306: Route setting unit
307: Route notification unit
308: Second determination unit
309: Use result creation unit
310: Subscriber information database creation unit
31: Storage unit
311: User information area
3111: Subscriber information database
3111: My page
312: Navigation information area
313: Facility information area
314: Connection history information area
32: Communication unit
4: Facility terminal
40: Control unit
401: Login processing unit
402: Distribution information editing unit
403: Customer information processing unit
404: Customer attraction information checking unit 405: Coupon processing unit
41: Storage unit
42: Communication unit

The invention claimed is:
1. A server which is communicably connected respectively to a portable terminal and a vehicle-mounted navigation device mounted on a vehicle, the server comprising:
   a wireless unit;
   a storage unit that stores facility information;
   a facility retrieval unit that retrieves facility information that satisfies predetermined criteria from the storage unit in response to an information distribution start request received from the vehicle-mounted navigation device via the wireless unit;
   a first determination unit that determines whether the portable terminal is present inside the vehicle based on current vehicle position information received from the vehicle-mounted navigation device via the wireless unit and current position information of the portable terminal received from the portable terminal via the wireless unit; and
   a facility information providing unit that directly transmits the facility information retrieved by the facility retrieval unit to both the vehicle mounted navigation device and the portable terminal via the wireless unit when the first determination unit determines that the portable terminal is present inside the vehicle.
2. The server according to claim 1, further comprising:
   upon receiving at least one item of facility information selected from items of facility information transmitted by the facility information providing unit from the portable terminal via the wireless unit, a route setting unit sets a facility corresponding to the facility information as a destination based on the selected at least one item of facility information; and
   a route notification unit that transmits facility information of the facility set as the destination to the vehicle-mounted navigation device via the wireless unit.
3. The server according to claim 2, wherein
   the route setting unit further creates route information from the current position of the vehicle to the facility set as the destination, and
   the route notification unit further transmits the route information to at least the vehicle-mounted navigation device via the wireless unit.
4. The server according to claim 2, further comprising:
   a second determination unit that determines whether the vehicle has stayed in the facility set as the destination based on ignition ON information of the vehicle received via the wireless unit, the position information of the vehicle at the ignition ON time, and position information of the facility set as the destination when the vehicle travels near the facility.
5. The server according to claim 3, further comprising:
   a second determination unit that determines whether the vehicle has stayed in the facility set as the destination based on ignition ON information of the vehicle received via the wireless unit, the position information of the vehicle at the ignition ON time, and position information of the facility set as the destination when the vehicle travels near the facility.

* * * * *